United States Patent
Koga

(10) Patent No.: US 10,866,577 B2
(45) Date of Patent: Dec. 15, 2020

(54) NUMERICAL CONTROLLER

(71) Applicant: FANUC CORPORATION, Yamanashi (JP)

(72) Inventor: Daijirou Koga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 6 days.

(21) Appl. No.: 16/214,434

(22) Filed: Dec. 10, 2018

(65) Prior Publication Data

US 2019/0196452 A1 Jun. 27, 2019

(30) Foreign Application Priority Data

Dec. 21, 2017 (JP) ................ 2017-244957

(51) Int. Cl.
*G05B 19/41* (2006.01)
(52) U.S. Cl.
CPC .... *G05B 19/41* (2013.01); *G05B 2219/31274* (2013.01); *G05B 2219/37336* (2013.01)
(58) Field of Classification Search
CPC ............... G05B 19/4093; G05B 19/41; G05B 2219/31274; G05B 2219/37336; G05B 2219/50001; G05B 2219/50003; G05B 2219/50171; G05B 2219/50359
See application file for complete search history.

(56) References Cited

U.S. PATENT DOCUMENTS

| | | | | |
|---|---|---|---|---|
| 6,442,436 B1* | 8/2002 | Nogami | ............... | G06F 11/3404 318/565 |
| 7,328,081 B2* | 2/2008 | Kluft | .................. | G05B 19/4065 700/175 |
| 8,364,288 B2* | 1/2013 | Chang | ................ | G05B 19/4083 700/189 |
| 9,568,904 B2* | 2/2017 | Suematsu | .......... | G05B 19/0426 |
| 10,241,496 B2* | 3/2019 | Chou | ................... | G05B 19/402 |

(Continued)

FOREIGN PATENT DOCUMENTS

| CN | 101706886 | 5/2010 |
|---|---|---|
| CN | 102233527 | 11/2011 |

(Continued)

OTHER PUBLICATIONS

Office Action dated Aug. 17, 2020 in the CN Patent Application No. 201811549619.2.

*Primary Examiner* — Abdelmoniem I Elamin
(74) *Attorney, Agent, or Firm* — Wenderoth, Lind & Ponack, L.L.P.

(57) ABSTRACT

To provide a numerical controller for facilitating mass production of various types of workpieces in comparison with a prior art, by controlling a rotary index machine or the like having a plurality of machining stations. A numerical controller for a machine tool executes multi-path control for collectively controlling a plurality of paths requiring conveyance operations between the processes when each of workpieces receives a plurality of processes. The numerical controller includes an execution unit for executing a plurality of machining programs each of which is generated for each of the workpieces so as to correspond to each of the paths, the plurality of machining programs including execution commands of the processes and conveyance commands between the processes.

6 Claims, 23 Drawing Sheets

(56) References Cited

U.S. PATENT DOCUMENTS

| | | | | |
|---|---|---|---|---|
| 10,374,711 B2* | 8/2019 | Ke | ............................ | H04B 10/25 |
| 2006/0178771 A1* | 8/2006 | Kluft | .................... | G05B 19/4065 |
| | | | | 700/177 |
| 2007/0225139 A1* | 9/2007 | Kojima | ................ | B23Q 3/15706 |
| | | | | 483/1 |
| 2010/0228384 A1* | 9/2010 | Neumaier | ............ | G05B 19/4083 |
| | | | | 700/173 |
| 2011/0137434 A1* | 6/2011 | Chang | .................. | G05B 19/4083 |
| | | | | 700/86 |
| 2017/0308057 A1* | 10/2017 | Kreidler | .............. | G05B 19/4069 |

FOREIGN PATENT DOCUMENTS

| | | |
|---|---|---|
| JP | 2-44404 | 2/1990 |
| JP | 11-42536 | 2/1999 |
| JP | 11-48098 | 2/1999 |
| JP | 2013-105844 | 5/2013 |

\* cited by examiner

| PATH 3 (PRIORITY 3) | PATH 2 (PRIORITY 2) | PATH 1 (PRIORITY 1) |
|---|---|---|
| G90 XM=50.0 P1 | G90 XM=50.0 P1 | G90 XM=50.0 P1 |
| G00 X_Y1_Z1_; <br> G01 X_Y1_Z1_; | G00 X_Y1_Z1_; <br> G01 X_Y1_Z1_; | G00 X_Y1_Z1_; <br> G01 X_Y1_Z1_; |
| G90 XM=150.0 P2 | G90 XM=150.0 P2 | G90 XM=150.0 P2 |
| G00 X_Y2_Z2_; <br> G01 X_Y2_Z2_; | G00 X_Y2_Z2_; <br> G01 X_Y2_Z2_; | G00 X_Y2_Z2_; <br> G01 X_Y2_Z2_; |
| G90 XM=250.0 P3 | G90 XM=250.0 P3 | G90 XM=250.0 P3 |
| G00 X_Y3_Z3_; <br> G01 X_Y3_Z3_; | G00 X_Y3_Z3_; <br> G01 X_Y3_Z3_; | G00 X_Y3_Z3_; <br> G01 X_Y3_Z3_; |
| O1000 | O1000 | O1000 |

| PATH 3 (PRIORITY 3) | PATH 2 (PRIORITY 2) | PATH 1 (PRIORITY 1) |
|---|---|---|
| G90 XM=50.0 P1 | G90 XM=50.0 P1 | G90 XM=50.0 P1 |
| G00 X_Y1_Z1_; <br> G01 X_Y1_Z1_; | G00 X_Y1_Z1_; <br> G01 X_Y1_Z1_; | G00 X_Y1_Z1_; <br> G01 X_Y1_Z1_; |
| G90 XM=150.0 P2 | G90 XM=150.0 P2 | G90 XM=150.0 P2 |
| G00 X_Y2_Z2_; <br> G01 X_Y2_Z2_; | G00 X_Y2_Z2_; <br> G01 X_Y2_Z2_; | G00 X_Y2_Z2_; <br> G01 X_Y2_Z2_; |
| G90 XM=250.0 P3 | G90 XM=250.0 P3 | G90 XM=250.0 P3 |
| G00 X_Y3_Z3_; <br> G01 X_Y3_Z3_; | G00 X_Y3_Z3_; <br> G01 X_Y3_Z3_; | G00 X_Y3_Z3_; <br> G01 X_Y3_Z3_; |
| O1000 | O1000 | O1000 |

FIG. 11

| PATH 3 (PRIORITY 3) | PATH 2 (PRIORITY 2) | PATH 1 (PRIORITY 1) |
|---|---|---|
| A=-200.0 P1<br>G00 X_Y1_Z1_;<br>G01 X_Y1_Z1_;<br>A=-100.0 P2<br>G00 X_Y2_Z2_;<br>G01 X_Y2_Z2_;<br>A=0.0 P3<br>G00 X_Y3_Z3_;<br>G01 X_Y3_Z3_;<br>O1000 | A=-100.0 P1<br>G00 X_Y1_Z1_;<br>G01 X_Y1_Z1_;<br>A=0.0 P2<br>G00 X_Y2_Z2_;<br>G01 X_Y2_Z2_;<br>A=100.0 P3<br>G00 X_Y3_Z3_;<br>G01 X_Y3_Z3_;<br>O1000 | A=0.0 P1<br>G00 X_Y1_Z1_;<br>G01 X_Y1_Z1_;<br>A=100.0 P2<br>G00 X_Y2_Z2_;<br>G01 X_Y2_Z2_;<br>A=200.0 P3<br>G00 X_Y3_Z3_;<br>G01 X_Y3_Z3_;<br>O1000 |

FIG. 12

| PATH 3 (PRIORITY 3) | PATH 2 (PRIORITY 2) | PATH 1 (PRIORITY 1) |
|---|---|---|
| A=-200.0 P1<br>G00 X_Y1_Z1_;<br>G01 X_Y1_Z1_;<br>A=-100.0 P2<br>G00 X_Y2_Z2_;<br>G01 X_Y2_Z2_;<br>A=0.0 P3<br>G00 X_Y3_Z3_;<br>G01 X_Y3_Z3_;<br>O1000 | A=-100.0 P1<br>G00 X_Y1_Z1_;<br>G01 X_Y1_Z1_;<br>A=0.0 P2<br>G00 X_Y2_Z2_;<br>G01 X_Y2_Z2_;<br>A=100.0 P3<br>G00 X_Y3_Z3_;<br>G01 X_Y3_Z3_;<br>O1000 | A=0.0 P1<br>G00 X_Y1_Z1_;<br>G01 X_Y1_Z1_;<br>A=100.0 P2<br>G00 X_Y2_Z2_;<br>G01 X_Y2_Z2_;<br>A=200.0 P3<br>G00 X_Y3_Z3_;<br>G01 X_Y3_Z3_;<br>O1000 |

FIG. 17

| PATH 3 (PRIORITY 3) | PATH 2 (PRIORITY 2) | PATH 1 (PRIORITY 1) |
|---|---|---|

```
PATH 3:
  A=-200.0 P1
    G00 X_Y1_Z1_;
    G01 X_Y1_Z1_;
  A=-100.0 P2
    G00 X_Y2_Z2_;
    G01 X_Y2_Z2_;
  A=0.0 P3
    G00 X_Y3_Z3_;
    G01 X_Y3_Z3_;
  O1000

PATH 2:
  A=-100.0 P1
    G00 X_Y1_Z1_;
    G01 X_Y1_Z1_;
  A=0.0 P2
    G00 X_Y2_Z2_;
    G01 X_Y2_Z2_;
  A=100.0 P3
    G00 X_Y3_Z3_;
    G01 X_Y3_Z3_;
  O1000

PATH 1:
  A=0.0 P1
    G00 X_Y1_Z1_;
    G01 X_Y1_Z1_;
  A=100.0 P2
    G00 X_Y2_Z2_;
    G01 X_Y2_Z2_;
  A=200.0 P3
    G00 X_Y3_Z3_;
    G01 X_Y3_Z3_;
  O1000
```

NUMERICAL CONTROLLER

This application is based on and claims the benefit of priority from Japanese Patent Application. No. 2017-244957, filed on 21 Dec. 2017, the content of which is incorporated herein by reference.

BACKGROUND OF THE INVENTION

Field of the Invention

The present invention relates to a numerical controller.

Related Art

In a conventional numerical controller, multi-path control for collectively controlling a plurality of paths integrates processes.
Representative examples of such conventional numerical controllers include a numerical controller for controlling a rotary index machine.
A rotary index machine has a plurality of machining stations, and different types of machining are executed in the respective stations.
In such a rotary index machine, when machining in all stations is completed, a common conveyance axis among the stations is rotated, thereby conveying the workpieces on the respective stations to the next stations simultaneously.
FIG. 25 shows one example of such a rotary index machine.
In a station 1, carrying-in work of a workpiece is performed.
In a station 2, milling is performed on a workplace.
In a station 3, drilling is performed on a workpiece.
In a station 4, carrying-out work of a workpiece is performed. As the conveyance axis for the station 1 to the station 4 rotates, one workpiece is conveyed to the station 1, the station. 2, the station. 3 and the station 1 in this order.
FIG. 26 shows the linearly-developed conveyance operation of the rotary index machine shown in FIG. 25, for the purpose of simplifying the description.
Each of a workpiece 1, a workpiece 2, a workpiece 3 and a workpiece 4 is conveyed to the station 1 (a path 1), the station 2 (a path 2), the station 3 (a path 3), and the station 4 (a path 4) in this order, thereby being subjected to carrying-in work, milling, drilling and carrying-out work in this order.
In an example, the workpiece 1 is conveyed from the station 1 to the station 2, and simultaneously the new workpiece 2 is carried into the station 1.
Thereafter, the workpiece 1 is conveyed from the station 2 to the station 3, and the workpiece 2 is conveyed from the station 1 to the station 2, and simultaneously the new workpiece 3 is carried into the station 1.
These conveyance operations are collectively performed at each time point after all the processes in the station 1 to the station 4 are completed.
As also disclosed in Patent Document 1, in a rotary index machine, respective stations have different devices and tools, and individual processes are respectively performed on different workpieces in the stations.
In this case in a prior art, a numerical controller prepares a machining program in which a process for each device (tool) is described, while each device repeatedly performs a process work according to the machining program on different workpieces.
Any one of the paths respectively corresponding to the stations or a path other than the paths representatively performs a conveyance operation.
As described above, in a conventional embodiment, each path corresponds to each device (tool).
That is, the terminology "path" in the prior art indicates a control path provided for each device (tool).
Patent Document 1: Japanese Unexamined Patent Application, Publication No. H11-48098

SUMMARY OF THE INVENTION

Such a rotary index machine is fundamentally suitable for mass production of one type of workpiece, and not suitable for mass production of various types of workpieces.
If a machining program is prepared for each device (tool) as in the prior art, the following problem occurs.
That is, the execution order of the plurality of machining programs on a workpiece is not read from the respective machining programs, and thus the following matters need to be known in order to recognize the execution order of the machining programs: which path (device) each machining program is registered to; which order respective stations and devices are disposed in; and which order one workpiece is subjected to respective types of machining in.
In addition, description of a conveyance command in a machining program is difficult, and thereby takes time and effort.
Specifically, if a conveyance command is issued during machining at any one of the stations, the targeted station is damaged.
Therefore, in a machining program, a waiting command of machining completion in all the paths needs to be described before a conveyance command.
An object of the present invention is to provide a numerical controller for facilitating mass production of various types of workpieces in comparison with the prior art.
(1) A numerical controller according to the present invention is a numerical controller (for example, a numerical controller 10 to be described below) for a machine tool, and the numerical controller executes multi-path control for collectively controlling a plurality of paths requiring conveyance operations between the processes when each of workpieces receives a plurality of processes. The numerical controller includes an execution unit (for example, an execution unit 106 to be described below) for executing a plurality of machining programs each of which is generated for each of the workpieces so as to correspond to each of the paths, the plurality of machining programs including execution commands of the processes and conveyance commands between the processes.
(2) The numerical controller according to (1) may further include a machining program generation unit (for example, a machining program generation unit 101 to be described below) for generating each of the machining programs for each of the workpieces so as to correspond to each of the paths and to include the execution commands of the processes and the conveyance commands between the processes.
(3) The numerical controller according to (1) or (2) may further include an arbitration unit (for example, an arbitration unit 105 to be described below) for arbitrating timings of the conveyance commands between the processes described in the machining programs, among the paths.
(4) The numerical controller according to (3) may further include a conveyance command reception unit (for example, a conveyance command reception unit 102 to be described below) for receiving each of the conveyance commands together with a conveyance priority serving as a priority of each of the conveyance commands. The arbitration unit (for example, the arbitration unit 105 to be described below) may arbitrate the timings of the conveyance commands on a basis of the conveyance priorities.

(5) The numerical controller according to (4) may further include a process determination unit for determining the processes described in each of the machining programs, and a conveyance command registration unit for registering each of the conveyance commands between the processes determined by the process determination unit.

(6) The numerical controller according to (4) or (5) may further include a conveyance priority calculation unit (for example, a conveyance priority calculation unit 103 to be described below) for calculating each of the conveyance priorities on a basis of an order of the conveyance commands in each of the machining programs corresponding to each of the paths. The arbitration unit (for example, the arbitration unit 105 to be described below) may arbitrate the timings of the conveyance commands on a basis of the conveyance priorities calculated by the conveyance priority calculation unit.

(7) The numerical controller according to (4) may further include a path priority reception unit (for example, a path priority reception unit 104 to be described below) for receiving a path priority serving as a priority for each of the paths. The arbitration unit (for example, the arbitration unit 105 to be described below) may arbitrate the timings of the conveyance commands on a basis of the conveyance priorities and the path priorities.

(8) In the numerical controller according to (3) to (7), the arbitration unit (for example, the arbitration unit 105 to be described below) and another numerical controller may communicate with each other to collectively arbitrate the timing of one or more conveyance commands included in the multi-path control to be executed by the own numerical controller and the timing of one or more conveyance commands included in the multi-path control to be executed by the another numerical controller.

(9) The numerical controller according to (1) to (8) may further include a conveyance command specification unit (for example, a conveyance command specification unit 107 to be described below) for specifying an arbitrary n-th conveyance command from among the conveyance commands described in each of the machining programs, a pre-conveyance command registration unit (for example, a pre-conveyance command registration unit 108 to be described below) for registering a pre-conveyance command to be executed before the n-th conveyance command, in each of the machining programs, and a post-conveyance command registration unit (for example, a post-conveyance command registration unit 109 to be described below) for registering a post-conveyance command to be executed after the n-th conveyance command, in each of the machining programs.

The present invention enables mass production of various types of workpieces to be facilitated in comparison with the prior art.

BRIEF DESCRIPTION OF THE DRAWINGS

FIG. 11 is another diagram illustrating the arbitration method using the conveyance priorities according to the first embodiment of the present invention.

FIG. 12 is another diagram illustrating the arbitration method using the conveyance priorities according to the first embodiment of the present invention.

FIG. 17 is another diagram illustrating the arbitration method using the conveyance priorities according to the first embodiment of the present invention.

DETAILED DESCRIPTION OF THE INVENTION

The outline of the present invention is described with reference to FIG. 1 and FIG. 2.

1. Outline of Invention

Figure 1:
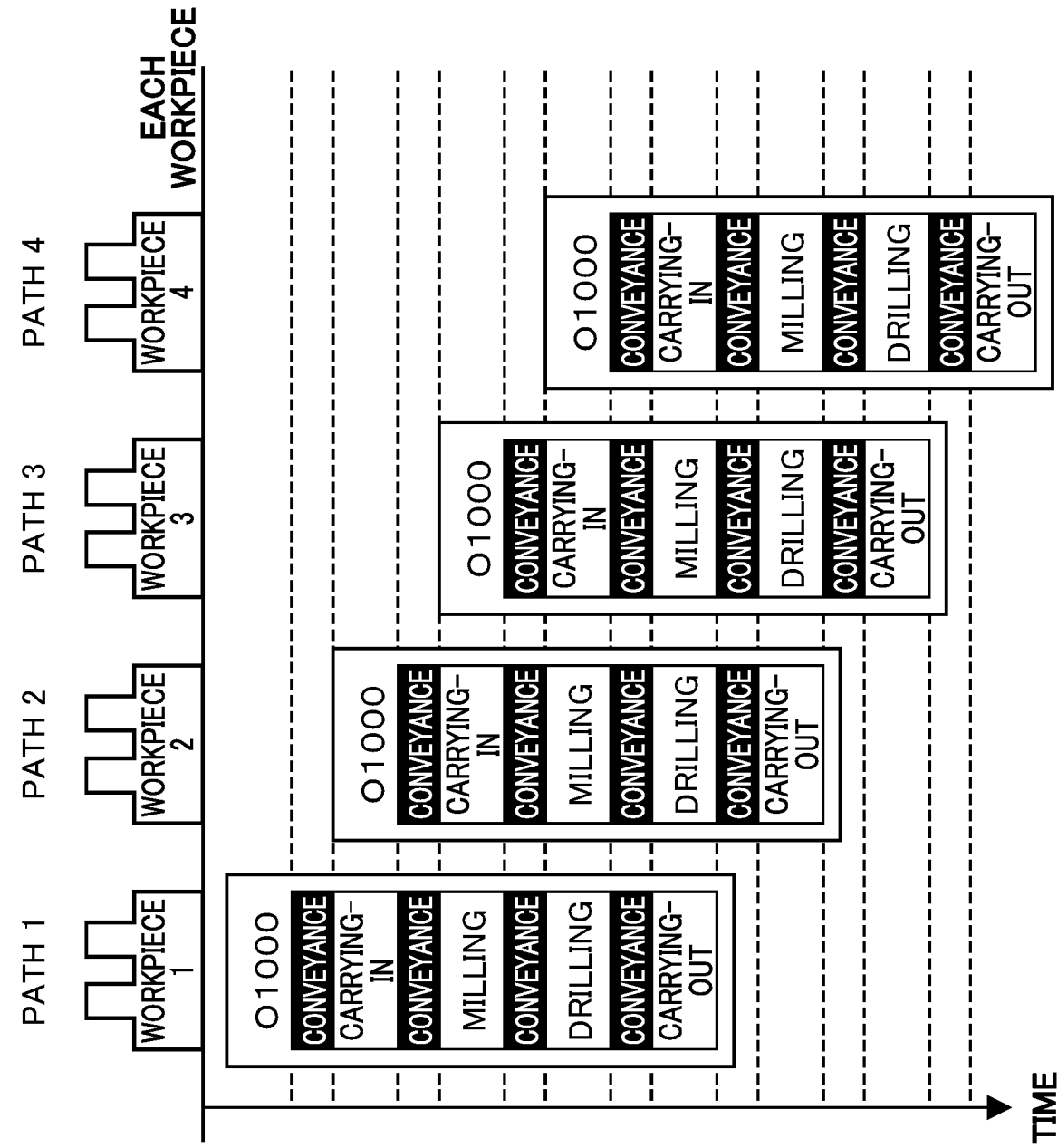
FIG. 1 is a diagram illustrating the outline of the present invention.
Figure 2:
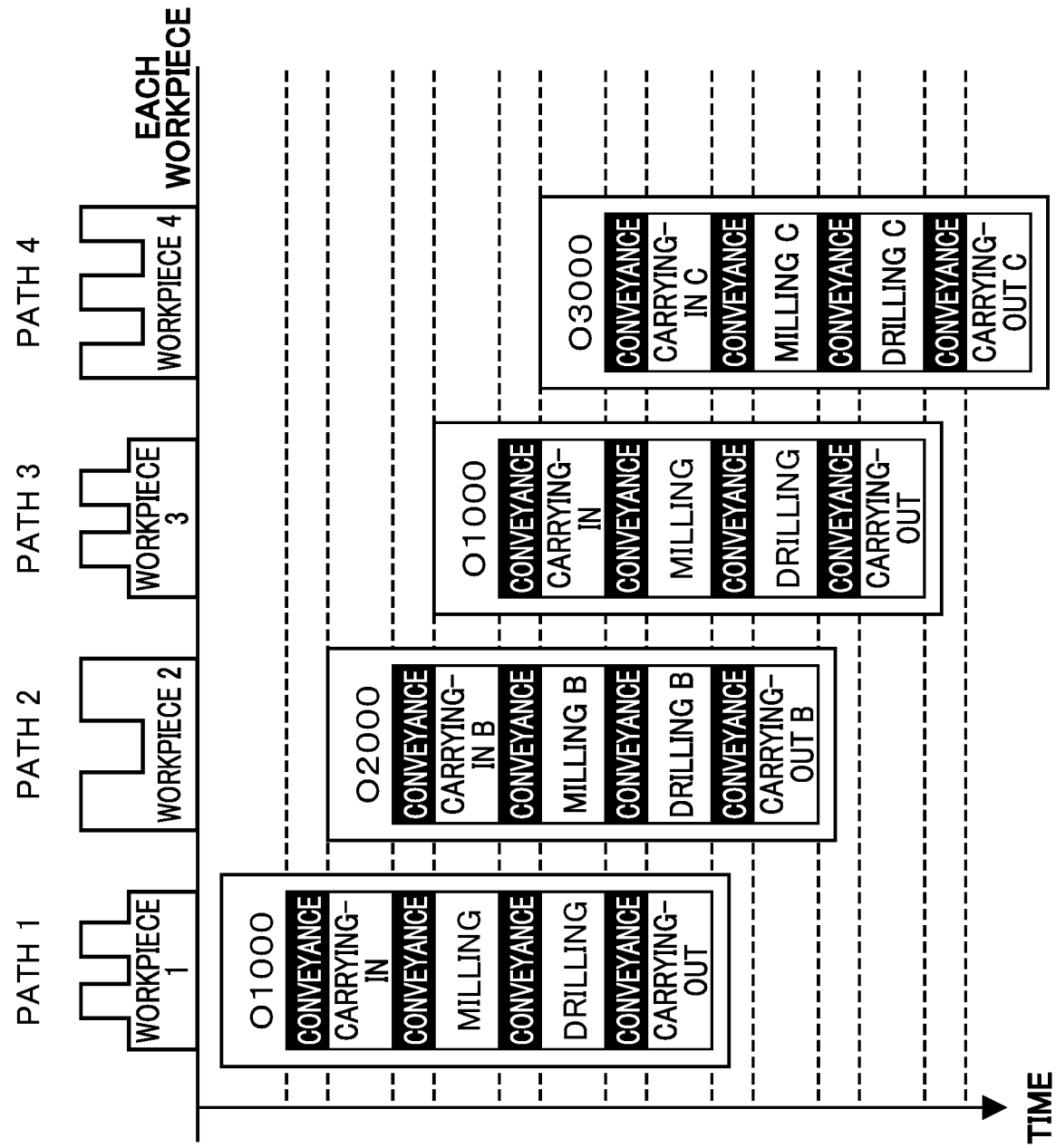
FIG. 2 is another diagram illustrating the outline of the present invention.

Each of FIG. 1 and FIG. 2 is a diagram for describing the basic concept of the present invention.

As described above, in the prior art, the numerical controller prepares a machining program in which a process for each device (tool) is described, while each device repeatedly performs a process work according to the machining program on different workpieces.

On the other hand, in the embodiments of the present invention, as shown in the time chart shown in FIG. 1, a numerical controller generates and executes a machining program in which processes are sequentially described for each workplace.

In the example shown in FIG. 1, a machining program named "O1000" includes an execution command of a carrying-in process, an execution command of a milling process, an execution command of a drilling process, an execution command of a carrying-out process, and conveyance commands between these processes.

The same machining program "O1000" is executed to a workpiece 1 of a path 1, a workpiece 2 of a path 2, a workpiece 3 of a path 3, and a workpiece 4 of a path 4.

In the prior art, each path fixedly having an axis executes a machining program, while partially exchanging axes with another path.

On the other hand, in the embodiments of the present invention, each path dynamically acquires the axis required for operation while arbitrarily changing the axis to another, thereby performing operation of each process.

In an example in this case, the path 1 repeats acquisition of a control right of a device required for performing each operation, and the release of the control right when the operation is completed, thereby advancing a machining program.

As shown in FIG. 1, the timings of the conveyance commands coincide with one other among the machining program "O1000" to be executed in the path 1, the machining program "O1000" to be executed in the path 2, the machining program. "O1000" to be executed in the path 3, and the machining program "O1000" to be executed in the path 4. Further, the respective start times of the machining programs are shifted in the paths, so that the same process is not simultaneously performed in any two machining programs.

Accordingly, while the carrying-in process is executed in the path 1, the carrying-in process is not executed in any other path. While the milling process is executed in the path 1, the milling process is not executed in any other path. While the drilling process is executed in the path 1, the drilling process is not executed in any other path. While the carrying-out process is executed in the path 1, the carrying-out process is not executed in any other path.

The same applies for the path 2 to the path 4.

FIG. 2 is an example of the time chart for the case where different machining programs are executed in respective paths. While the same machining program "O1000" as that in FIG. 1 is executed in the path 1 and the path 3, a machining program named "O2000" is executed in the path 2, and a machining program named "O3000" is executed in the path 4.

The machining program "O2000" includes a "carrying-in B" process, a "milling B" process, a "drilling B" process, and a "carrying-out B" process, instead of the respective processes of the "carrying-in" process, the "milling" process, the "drilling" process, and the "carrying-out" process included in the machining program "O1000."

The devices to be used or the described operation contents are different between the "carrying-in" process and the "carrying-in B" process, between the "milling" process and the "milling B" process, between the "drilling" process and the "drilling B" process, and between the "carrying-out" process and the "carrying-out B" process.

Similarly, the machining program "O3000" includes a "carrying-in C" process, a "mill C" process, a "drilling C" process, and a "carrying-out C" process, instead of the respective processes of the "carrying-in" process, the "milling" process, the "drilling" process, and the "carrying-out" process included in the machining program "O1000."

The devices to be used or the described operation contents are different between the "carrying-in" process and the "carrying-in C" process, between the "milling" process and the "milling C" process, between the "drilling" process and the "drilling C" process, and between the "carrying-out" process and the "carrying-out C" process.

The timings of the conveyance commands coincide with one other among the machining program "O1000," the machining program "O2000," and the machining program "O3000," and the same process is not executed simultaneously among them.

As described above, in the embodiment of the present invention, one machining program is generated for each type of workpiece, and each workpiece is subjected to machining in each path.

Accordingly, machining programs different for each workpiece are executed, thereby enabling different workpieces to be produced. This facilitates mixed flow production, and the first embodiment is thus suitable for mass production of various types of workpieces.

It is noted that in the embodiment of the present invention, each path corresponds to each workpiece.

That is, the terminology "path" in the present invention indicates a control path provided for each workpiece.

2. First Embodiment

The first embodiment according to the present invention is described below with reference to FIG. 3 to FIG. 19.

2.1 Structure of Invention

Figure 3:
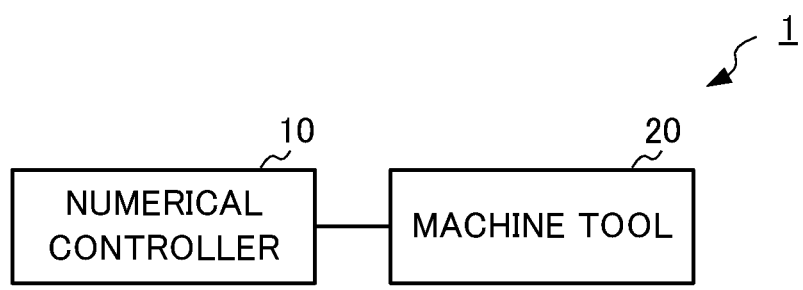
FIG. 3 is a configuration diagram of a numerical control system according to a first embodiment of the present invention.

FIG. 3 shows an overall configuration example of a numerical control system 1 according to the first embodiment of the present invention.

The numerical control system 1 includes a numerical controller 10 and a machine tool 20.

The numerical controller 10 and the machine tool 20 are capable of communicating with each other.

The numerical controller 10 and the machine tool 20 may be directly and communicably connected to each other, or may be communicably connected via a network not shown.

The numerical controller 10, which is a device for numerically controlling the machine tool 20, transmits a control signal to the machine tool 20, thereby controlling the machine tool 20 to perform predetermined machining.

More specifically, the numerical controller 10 generates a machining program for machining a workpiece on the basis of a command input by a user, and executes the machining program, thereby controlling the respective axes included in the machine tool 20.

It is noted that respective functions of the numerical controller 10 in the first embodiment are described in detail with reference to FIG. 4.

The machine tool 20 performs predetermined machining such as cutting under the control of the numerical controller 10. The machine tool 20 includes a motor to be driven so as to machine a workpiece; a spindle and a feed axis attached to the motor; jigs and tools corresponding to the respective axes; and the like.

The machine tool 20 drives the motor on the basis of the operation command output by the numerical controller 10, thereby performing predetermined machining.

The contents of the predetermined machining are not particularly limited, and another type of machining than cutting, such as grinding, polishing, rolling or forging, may be performed.

In the first embodiment, the machine tool 20 has a plurality of paths (stations), and one or more processes such as machining, carrying-in and carrying-out a workplace are executed in each path (each station).

In addition, the machine tool 20 rotates the conveyance axis common to the respective paths, whereby a workpiece is conveyed between the processes.

Figure 4:
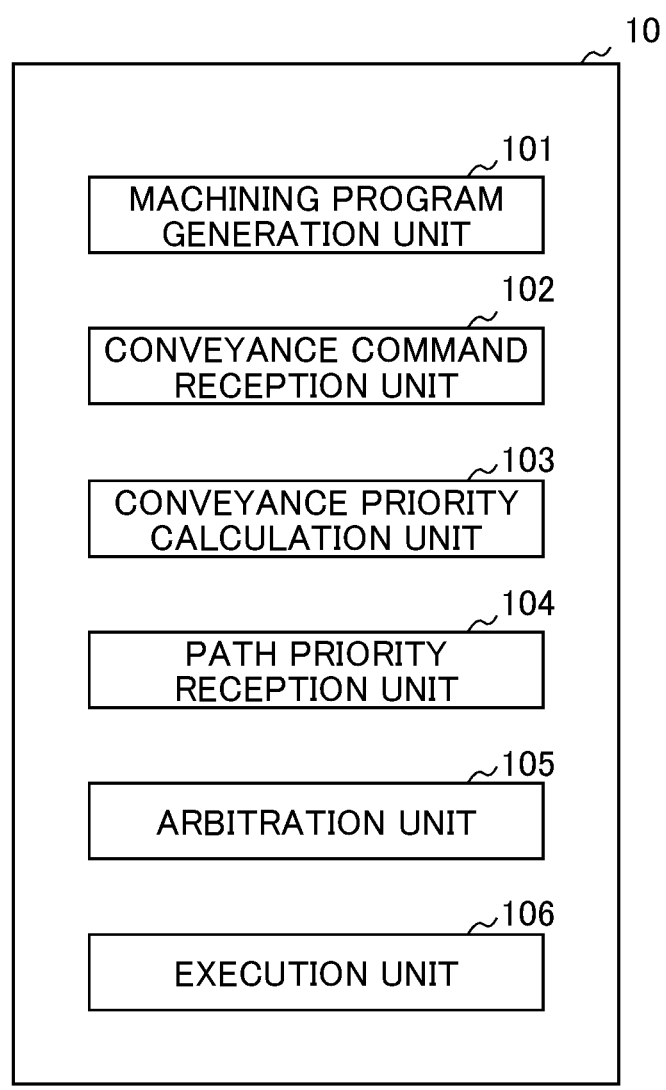
FIG. 4 is a functional block diagram of the numerical controller according to the first embodiment of the present invention.

FIG. 4 is a functional block diagram of the numerical controller 10.

The numerical controller 10 includes a machining program generation unit 101, a conveyance command reception unit 102, a conveyance priority calculation unit 103, a path priority reception unit 104, an arbitration unit 105, and an execution unit 106.

The machining program generation unit 101 generates a machining program for executing a process in the machine tool 20, on the basis of the command input into the numerical controller 10 by a user.

The machining program includes process execution commands described according to a processing order, and conveyance commands described between processes.

The conveyance command reception unit 102 receives a conveyance command together with a conveyance priority from the outside of the numerical controller 10 via an interface (not shown).

The conveyance priority herein is a priority of each conveyance command, and the execution unit 106 to be described below executes the conveyance commands in order starting with the conveyance command having the highest priority.

The conveyance priority calculation unit 103 calculates a conveyance priority of each conveyance command, on the basis of the position of the conveyance command in the machining program.

The path priority reception unit 104 receives a path priority serving as a priority for each path, from the outside of the numerical controller 10 via an interface (not shown). The path priority herein is a priority indicating the path for which conveyance commands are prioritized. In the case where conveyance commands having the same conveyance priority exist in different paths, the execution unit 106 to be described below preferentially executes a conveyance command in a path having a higher path priority.

The arbitration unit 105 arbitrates, among the paths, the timings of the conveyance commands described between processes in the machining programs.

The execution unit 106 executes a plurality of machining programs existing in the paths, respectively.

The numerical controller 10 having the above-described configuration executes multi-path control while arbitrating the timings of the conveyance commands among the plurality of paths.

The configuration of the numerical controller 10 is as described above.

A specific arbitration method performed by the numerical controller 10 is described below with reference to FIG. 5 to FIG. 7.

2.2 Arbitration Method

Figure 5:
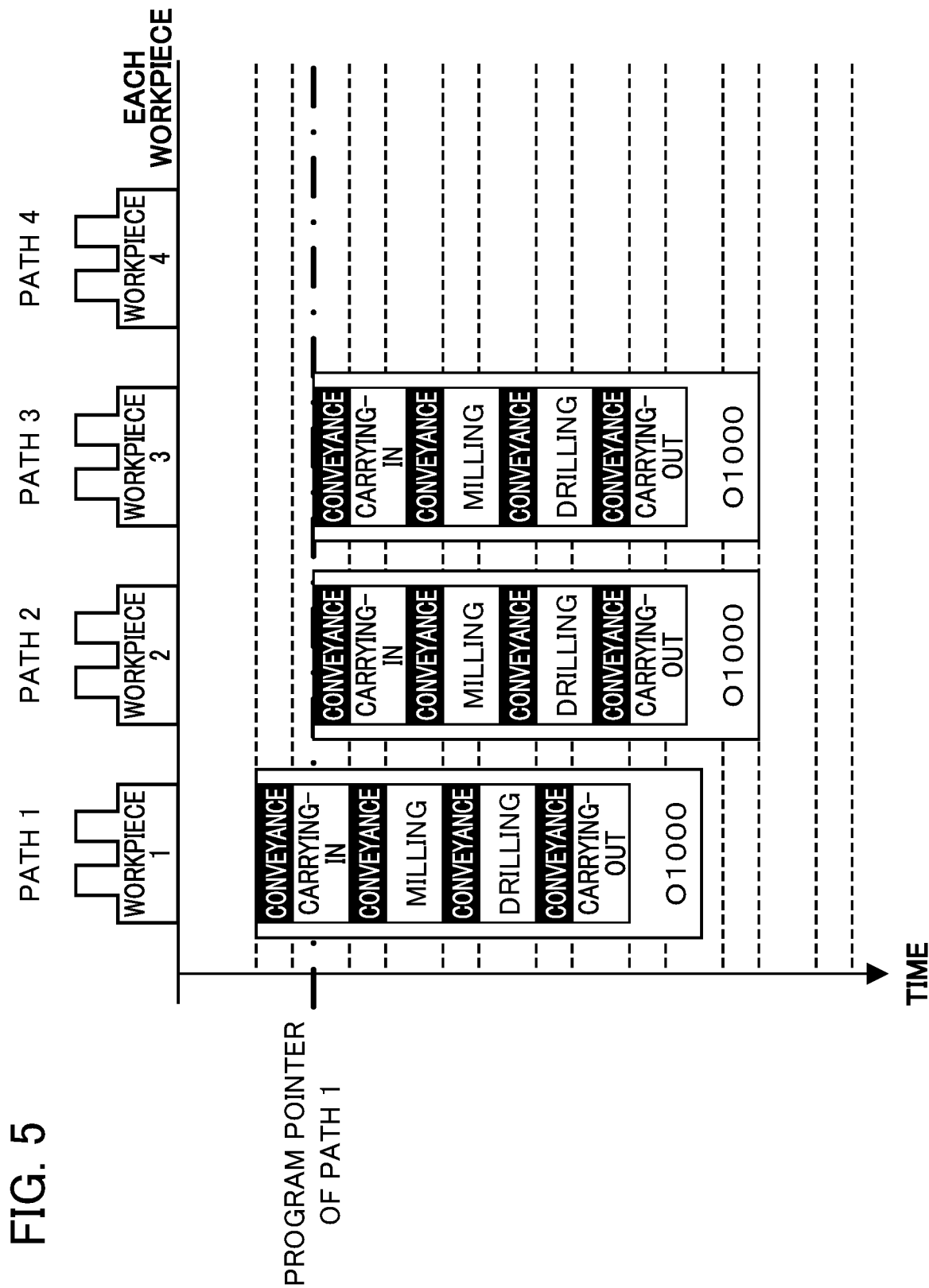
FIG. 5 is a diagram illustrating an arbitration method according to the first embodiment of the present invention.

FIG. 5 shows an example of a time chart of the machining programs for the respective paths at the stage where the conveyance commands are not arbitrated yet.

In the example shown in FIG. 5, the same machining program "O1000" is to be executed in the path 1 to the path 3, thereby manufacturing the workpiece 1 to the workpiece 3 of the same type.

At the time point shown in FIG. 5, since the machining program "O1000" of the path 1 is in the stage where the "carrying-in" process is being executed, a program pointer points to the command in the "carrying-in" process, and simultaneously the machining programs "O1000" of the path 2 and the path 3 are each in the stage of starting.

If the machining programs "O1000" of the path 2 and the path 3 are to be executed as they are, the conveyance commands in the machining programs "O1000" of the path 2 and the path 3 are executed during the execution of the "carrying-in" process in the machining program "O1000" of the path 1, whereby a station of the machine tool 20 or a carrying-in device or the like in operation may be damaged.

Figure 6:
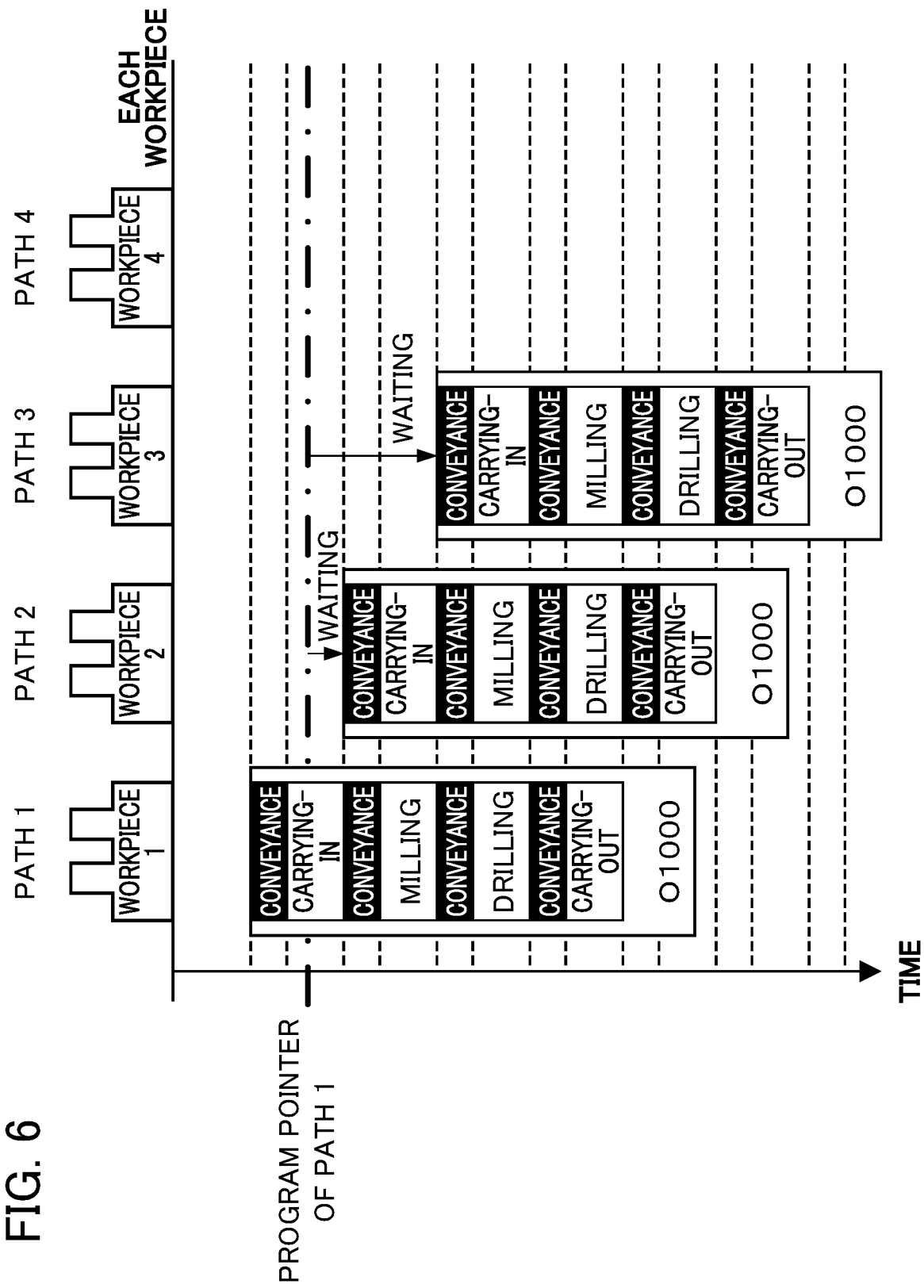
FIG. 6 is another diagram illustrating the arbitration method according to the first embodiment of the present invention.

To solve the problem, as shown in FIG. 6, the arbitration unit 105 arbitrates the timings of the conveyance commands among the machining program "O1000" of the path 1, the machining program "O1000" of the path 2, and the machining program "O1000" of the path 3.

Specifically, the arbitration unit 105 delays the start time of the execution of the machining program of the path 2, so that the start time of the first conveyance command in the machining program "O1000" of the path 2 coincides with the start time of the second conveyance command in the machining program "O1000" of the path 1.

Similarly, the arbitration unit 105 delays the start time of the execution of the machining program of the path 3, so that the start, time of the first conveyance command in the machining program. "O1000" of the path 3 coincides with the start time of the third conveyance command in the machining program "O1000" of the path 1.

As a result, the timings of the conveyance commands in the machining programs "O1000" coincide with each other among the path 1 to the path 3, and the simultaneous execution of the same process is also prevented.

Figure 7:
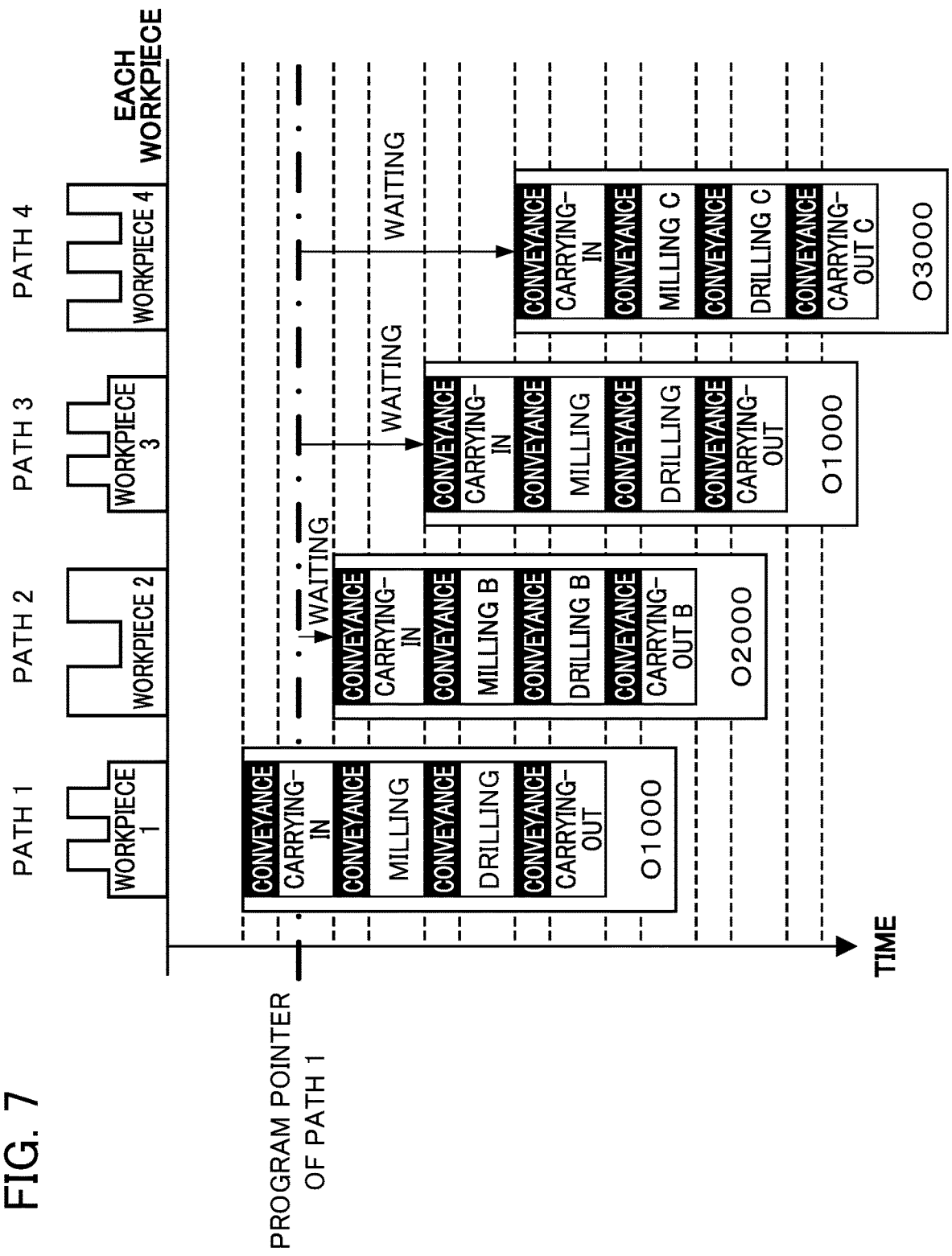
FIG. 7 is another diagram illustrating the arbitration method according to the first embodiment of the present invention.

FIG. 7 shows an example of a time chart after the conveyance commands are arbitrated in the case where different machining programs "O1000," "O2000," and "O3000" among the paths are executed.

Also in the example shown in FIG. 7, as in the example shown in FIG. 6, the arbitration unit 105 shifts the respective start times of the execution of the machining program "O2000" of the path 2, the machining program "O1000" of the path 3 and the machining program "O3000" of the path 4, whereby the timings of the conveyance commands in the machining programs coincide with each other among the path 1 to the path 4, and further enables the simultaneous execution of the same process to be prevented.

The outline of the control method of the numerical controller 10 is as described above.
The next description is about the contents of the conveyance command to be executed under the control of the numerical controller 10.

2.3 Contents of Conveyance Command

Figures 8A, 8B:
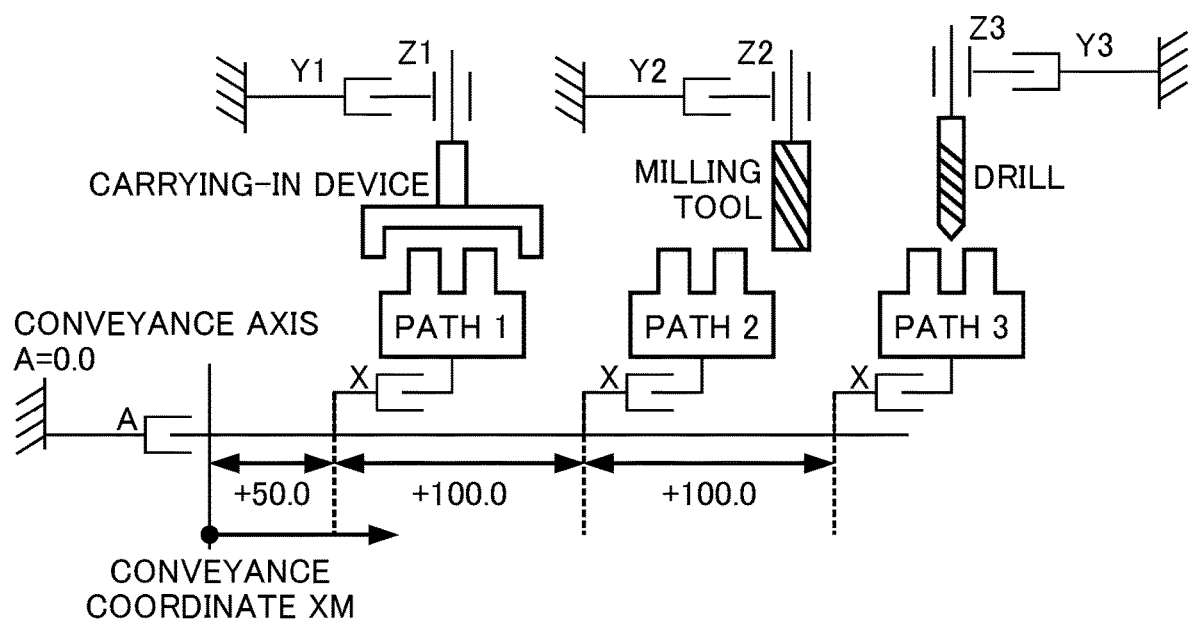
FIG. 8A is a diagram illustrating the arbitration method using conveyance priorities according to the first embodiment of the present invention.
FIG. 8B is a diagram illustrating change of a conveyance axis in the arbitration method using the conveyance priorities according to the first embodiment of the present invention.
Figures 9A, 9B:
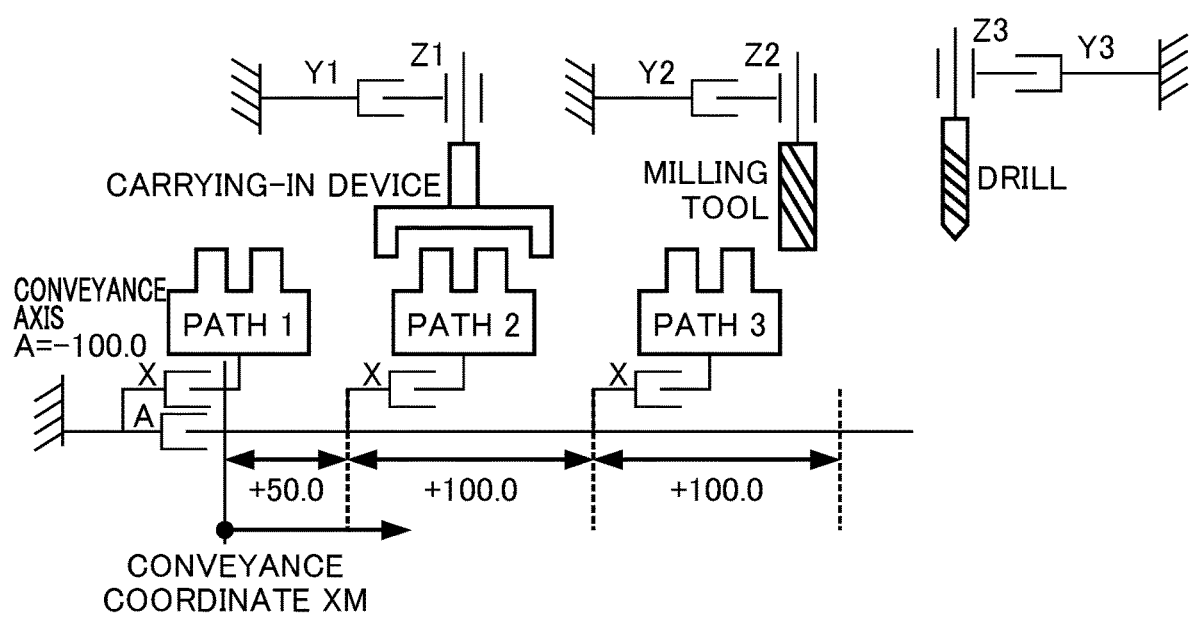
FIG. 9A is another diagram illustrating the arbitration method using the conveyance priorities according to the first embodiment of the present invention.
FIG. 9B is another diagram illustrating change of the conveyance axis in the arbitration method using the conveyance priorities according to the first embodiment of the present invention.
Figures 10A, 10B:
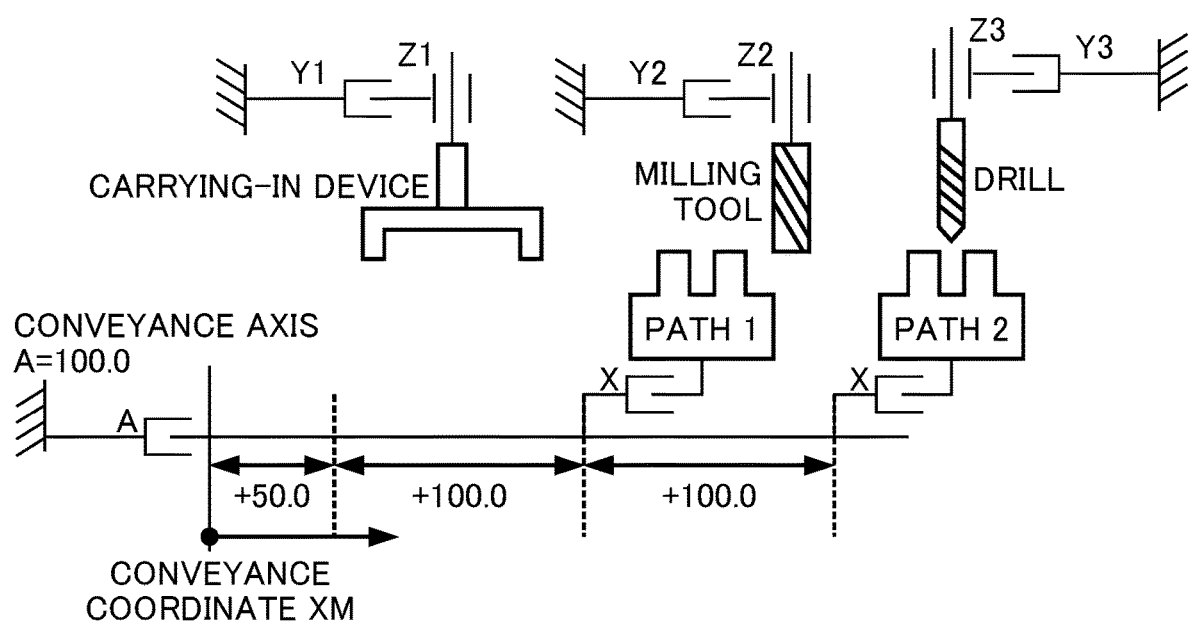
FIG. 10A is another diagram illustrating the arbitration method using the conveyance priorities according to the first embodiment of the present invention.
FIG. 10B is another diagram illustrating change of the conveyance axis in the arbitration method using the conveyance priorities according to the first embodiment of the present invention.

FIG. 8A, FIG. 9A and FIG. 10A respectively show examples of the conveyance commands described in the machining programs. In the examples shown in FIG. 8A, FIG. 9A, and FIG. 10A, each conveyance command is issued, so as to include a command "G90" indicating that the conveyance command is issued on the basis of an absolute coordinate value, and include an address "XM" specifying a conveyance coordinate value with respect to the conveyance axis.

An address "P" specifies a conveyance priority of a conveyance command.

The conveyance coordinate value herein is a coordinate value in a conveyance coordinate system XM commonly used in all the paths, for specifying to which coordinate value a workpiece in each path is to be shifted in the conveyance coordinate system XM.

In an example, the conveyance command of "G90 XM=50.0 P1" is described in the first line of the machining program "O1000" of the path 1 shown in FIG. 8A. This command indicates that the workpiece of the path 1 is to be conveyed to the position of XM=50.0 in the conveyance coordinate system XM.

FIG. 8B shows examples of the positions of the respective workpieces of the path 1 to the path 3 after the execution of this conveyance command.

It is noted that in the state shown in FIG. 8B, the coordinate value of a conveyance axis A used to convey the path 1, the path 2 and the path 3 is set as A=0.0.
That is, in the path 1, the coordinate value of the conveyance axis A is set as A=0.0, so as to realize the conveyance command including XM=50.0.

The term "P1" in the command corresponds to the above-described conveyance priority, and the details thereof will be described below.

The conveyance command of "G90 XM=50.0 P1" is described in the first line of the machining program "O1000" of the path 2 shown in FIG. 9A. This command indicates that the workpiece of rue path 2 is to be conveyed to the position of XM=50.0 in the conveyance coordinate system XM.

FIG. 9B shows examples of the positions of the respective workpieces of the path 1 to the path 3 after the execution of this conveyance command.

The workpiece of the path 2, having been positioned at XM=150.0 before shifting in the state shown in FIG. 8B, is shifted to the position of XM=50.0, whereby the coordinate value of the conveyance axis A is shifted and positioned at A=−100.0.

That is, the coordinate value of the conveyance axis A is set as A=100.0, in order that the conveyance command including XM=50.0 is realized in the path 2.

The conveyance command of "G90 XM=150.0 P2" is described in the fourth line of the machining program "O1000" of the path 1 shown in FIG. 10A. This command indicates that the workpiece of the path 1 is to be conveyed to the position of XM=150.0 in the conveyance coordinate system XM.

FIG. 10B shows examples of the positions of the respective workpieces of the path 1 to the path 3 after the execution of this conveyance command.

The workpiece of the path 1, having been positioned at XM=50.0 before shifting in the state shown in FIG. 8B, is shifted to the position of XM=150.0, whereby the coordinate value of the coordinate axis A is shifted and positioned at A=100.0.

That is, the coordinate axis A is set as A=100.0, in order that the conveyance command including XM=150.0 is realized in the path 1.

As described above, even if the same conveyance command is issued in the respective paths, the conveyance axis A serving as a desired actual end point has various coordinate values.

It is noted that in the machine tool 20 such as a rotary index machine, the respective stations are equally spaced, and the numerical controller 10 has the information on the position values set in advance of the respective stations with respect to the reference position of the conveyance axis. The numerical controller 10 is capable of calculating a desired coordinate value of the conveyance axis A at the time when a conveyance command is issued in each path, by use of such a value set in advance.

The contents of the conveyance command are as described above.

It is noted that the above description is based on the example case where the conveyance commands are described in the programs. Alternatively, the numerical controller 10 may include a process determination unit for determining each process in the programs, and a conveyance command registration unit for automatically registering a conveyance command between the processes determined by the process determination unit.

This enables time and effort, to be saved in describing the conveyance commands in the programs, thereby improving convenience.

The next description is about a conveyance priority and a path priority associated with a conveyance command.

2.4 Conveyance Priority and Path Priority

FIG. 11 shows the values converted into the coordinate values of the conveyance axis A, from the conveyance coordinates included in the conveyance commands described in the machining programs "O1000" in FIG. 8A, FIG. 9A and FIG. 10A, for the sake of convenience in description.
It is noted that in each of FIG. 11 to FIG. 17, the position of the program pointer is indicated by a dotted line.

In FIG. 11, it is assumed that the execution of the machining programs "O1000" is started simultaneously in the respective paths.

The signs of "P1," "P2" and "P3" assigned to the conveyance commands indicate the conveyance priorities, wherein the larger the numerical value is, the higher the priority is.

The conveyance commands in the first lines of the machining programs "O1000" of the path 1 to the path 3 shown in FIG. 11 respectively have the same conveyance priority of "P1," and the conveyance priorities are thus equal.

In such a case where the conveyance priorities are equal, the arbitration unit 105 of the numerical controller 10 determines a conveyance command to be executed, on the basis of the path priorities set for each of the paths.

In the example shown in FIG. 11, the path 3 has the highest priority, whereby the conveyance command of "A=−200.0 P1" of the path 3 is to be executed.

The arbitration unit 105 suspends the conveyance commands of the path 1 and the path 2 not executed this time, and delays the start times of the execution of the machining programs "O1000" of the path 1 and the path 2, as shown in FIG. 12.

It is noted that in the case of delaying the start times of the machining programs "O1000" of the path 1 and path 2, the arbitration unit 105 delays the start times of the execution so that the timings of the conveyance commands included in the machining programs of the respective paths coincide with one another.

Figure 13:
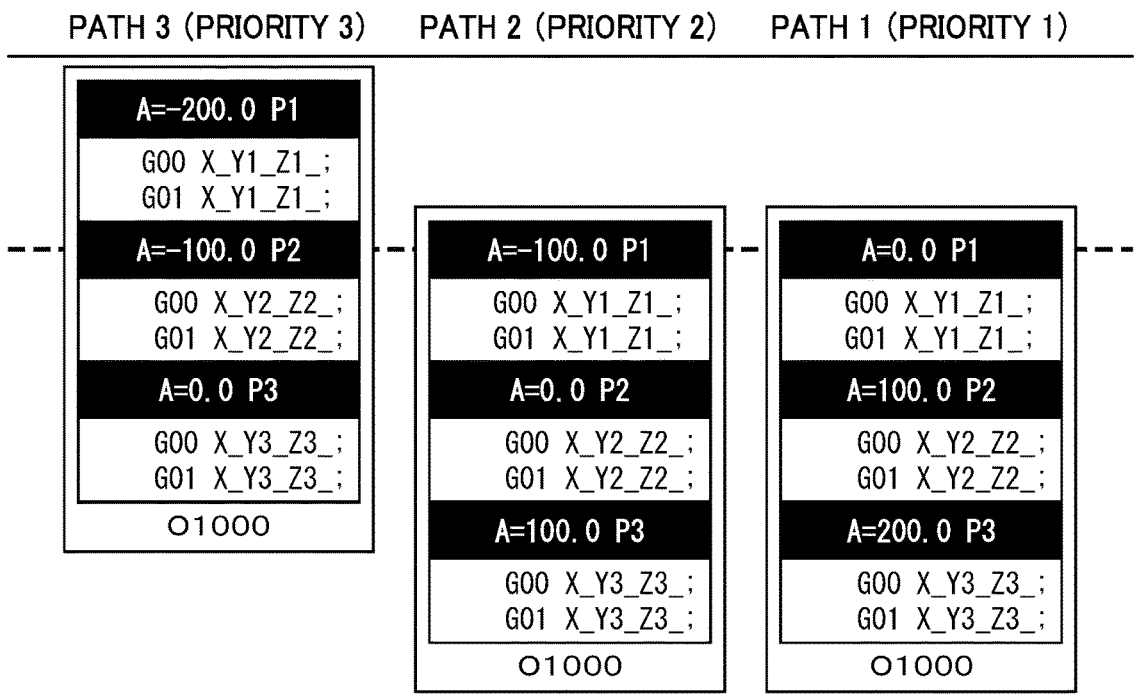
FIG. 13 is another diagram illustrating the arbitration method using the conveyance priorities according to the first embodiment of the present invention.

Thereafter, as shown in FIG. 13, the position of the program pointer is shifted to the position of the second conveyance command in the machining program "O1000" of the path 3, and the first conveyance commands in the machining programs "O1000" of the path 1 and the path 2.

In this case, the conveyance command of the path 3 has the priority of "P2," while the conveyance commands of the path 1 and the path 2 respectively have the priority of "P1." Therefore, the conveyance command of the path 3 is executed preferentially.

The coordinate value of the conveyance axis A included in the conveyance command of the path 3 is A=−100.0, and the coordinate value of the conveyance axis A included in the conveyance command of the path 2 is also A=−100.0, meaning that the coordinate values are equal with each other. Thus, the conveyance command "A=−100.0 P2" of the path 3 is executed, whereby the conveyance command "A=−100.0 P1" is also executed simultaneously.

As a result, in the path 2 and the path 3, the execution unit 106 is able to proceed to the execution of the subsequent processes.

Figure 14:
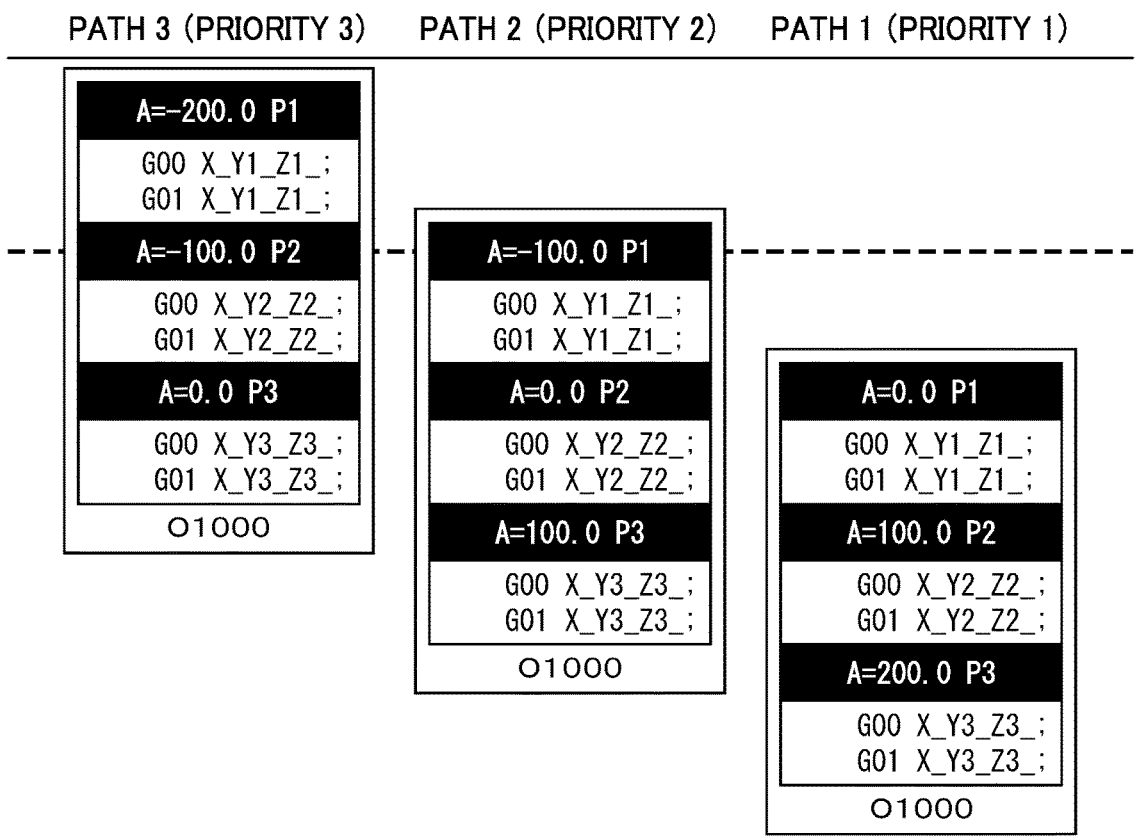
FIG. 14 is another diagram illustrating the arbitration method using the conveyance priorities according to the first embodiment of the present invention.

On the other hand, the conveyance command "A=0.0 P1" of the path 1 is again suspended by the arbitration unit 105. That is, as shown in FIG. 14, the arbitration unit 105 further delays the start time of the execution of the machining program "O1000" of the path 1.

Figure 15:
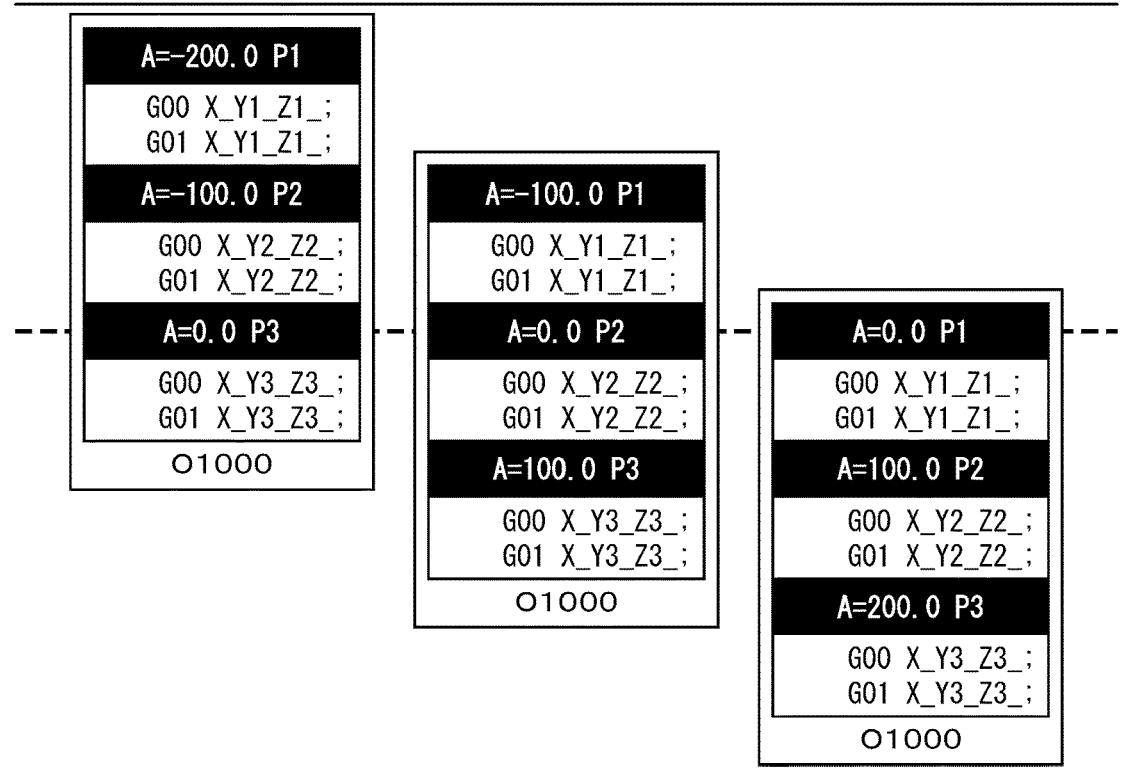
FIG. 15 is another diagram illustrating the arbitration method using the conveyance priorities according to the first embodiment of the present invention.

Thereafter, as shown in FIG. 15, the position of the program pointer is shifted to the position of the third conveyance command in the machining program "O1000" of the path 3, the second conveyance command in the machining program "O1000" of the path 2, and the first conveyance command in the machining program "O1000" of the path 1.

In this case, the conveyance command of the path 3 has the priority of "P3," the conveyance command of the path 2 has the priority of "P2," and the conveyance command of the path 1 has the priority of "P1." Therefore, the conveyance command of the path 3 is executed preferentially.

The coordinate value of the conveyance axis A included in the conveyance command of the path 3 is A=0.0, the coordinate value of the conveyance axis A included in the conveyance command of the path 2 is also A=0.0, and the coordinate value of the conveyance axis A included in the conveyance command of the path 1 is also A=0.0, meaning that the coordinate values are all equal. Thus, the conveyance command "A=0.0 P3" of the path 3 is executed, whereby the conveyance command "A=0.0 P2" of the path 2 and the conveyance command. "A=0.0 P1" of the path 1 are executed simultaneously.

As a result, in all of the path 1 to the path 3, the execution unit is able to proceed to the execution of the subsequent processes.

Figure 16:
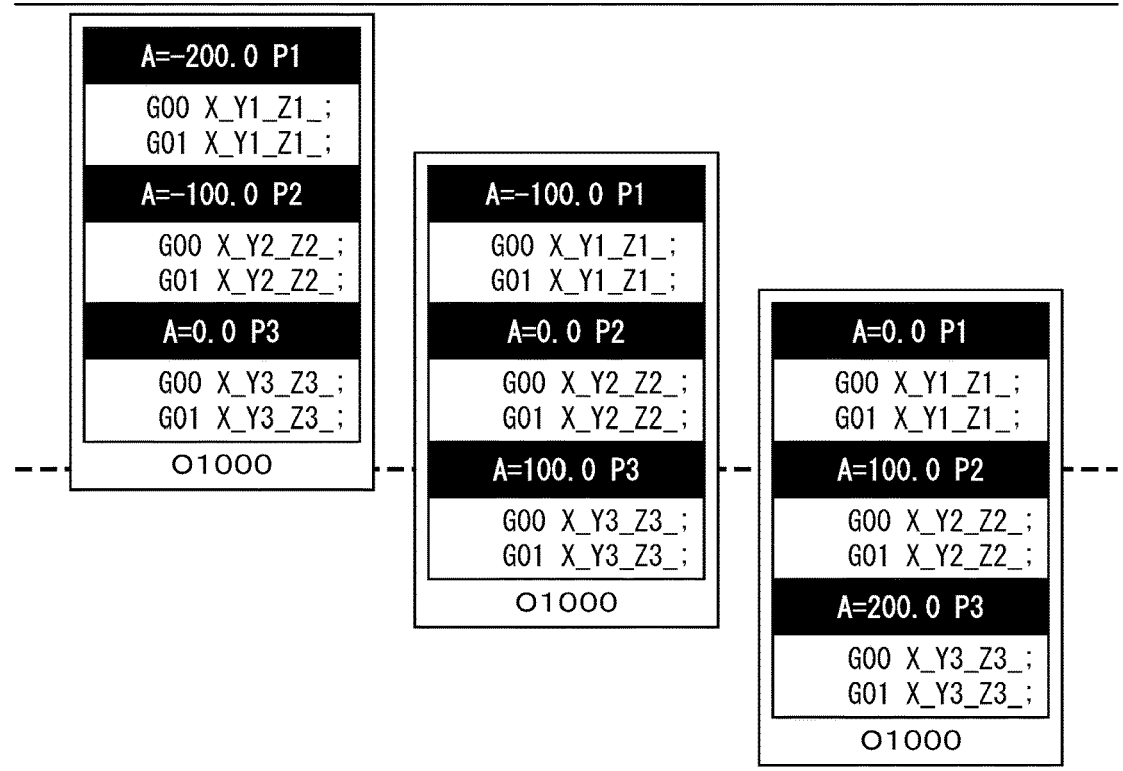
FIG. 16 is another diagram illustrating the arbitration method using the conveyance priorities according to the first embodiment of the present invention.

Thereafter, the execution of all the commands in the machining program "O1000" is completed in the path 3, and the position of the program pointer is shifted to the position or the third conveyance command in the machining program "O1000" of the path 2, and the second conveyance command in the machining program "O1000" of the path 1, as shown in FIG. 16.

In this case, the conveyance command of the path 2 has the priority of "P3," while the conveyance command of the path 1 has the priority of "P2." Therefore, the conveyance command of the path 2 is executed preferentially.

The coordinate value of the conveyance axis A included in the conveyance command of the path 2 is A=100.0, and the coordinate value of the conveyance axis A included in the conveyance command of the path 1 is also A=100.0, meaning that the coordinate values are equal with each other. Thus, the conveyance command "A=100.0 P3" of the path 2 is executed, whereby the conveyance command "A=100.0 P2" is also executed simultaneously.

As a result, in both the path 1 and the path 2, the execution unit 106 is able to proceed to the execution of the subsequent processes.

Thereafter, the execution of all the commands in the machining program "O1000" is completed in the path 2, and the position of the program pointer is shifted to the position of the third conveyance command in the machining program "O1000," as shown in FIG. 17.

Since the execution of all the commands in the machining programs is completed in the path 2 and the path 3, the execution unit 106 executes the conveyance command of the path 1 without arbitration of timings between conveyance commands by the arbitration unit 105, and thereafter executes the subsequent processes to complete the execution of all the machining programs.

The method of arbitrating the conveyance commands using the conveyance priorities and the path priorities is as described above.

The next description is about a method of calculating the conveyance priority.

2.5 Method of Calculating Conveyance Priority

With respect to the conveyance priority, a lower priority may be given to an earlier conveyance command in a machining program in a basic manner (in other words, a higher priority may be given to a conveyance command described later in time). Accordingly, the conveyance commands in the machining program are counted from the top to the targeted conveyance command, and the resultant count number may be regarded as a P command indicating a conveyance priority.

It is noted that a smaller-number P command is regarded as a lower conveyance priority.

Figure 18:
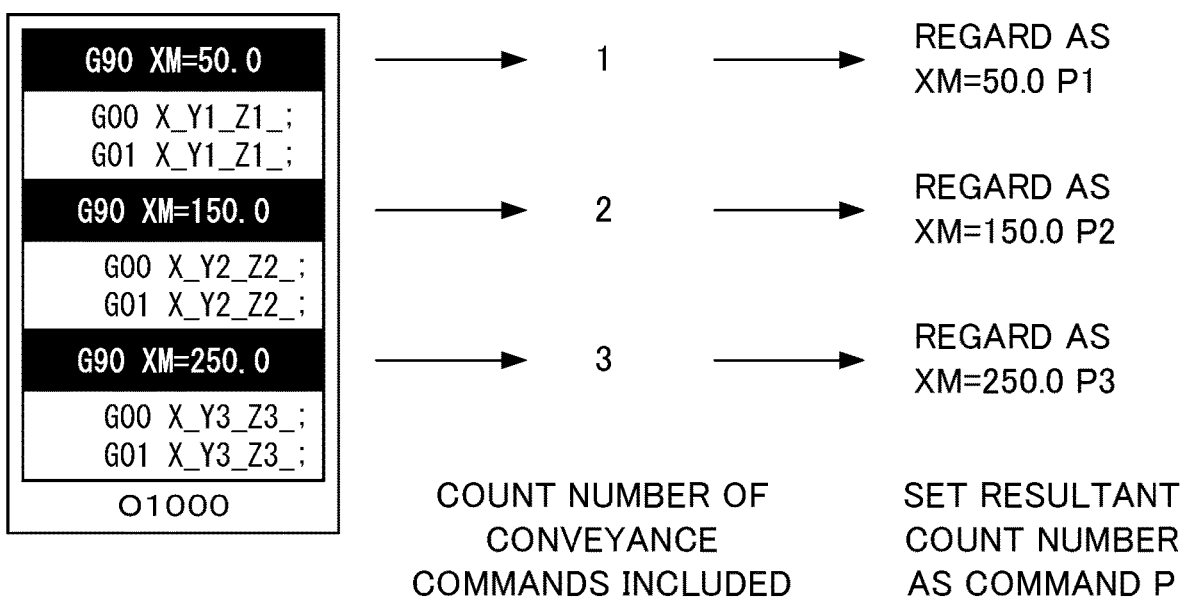
FIG. 18 is a diagram illustrating a method of calculating the conveyance priority according to the first embodiment of the present invention.

In the example shown in FIG. 18, "G90 XM=50.0" serves as the first conveyance command, "G90 XM=150.0" serves as the second conveyance command, and "G90 XM=250.0" serves as the third conveyance command.

In this case, since the respective count values are 1, 2, 3 in order, the conveyance priorities of the conveyance commands are regarded as "P1," "P2" and "P3," respectively.

This does not require the P command, thereby eliminating time and effort to input the P command, and hence improving convenience.

The method of calculating a conveyance priority is as described above.

The next description is about the operation of the numerical controller 10.

2.6 Operation of Numerical Controller 10

Figure 19:
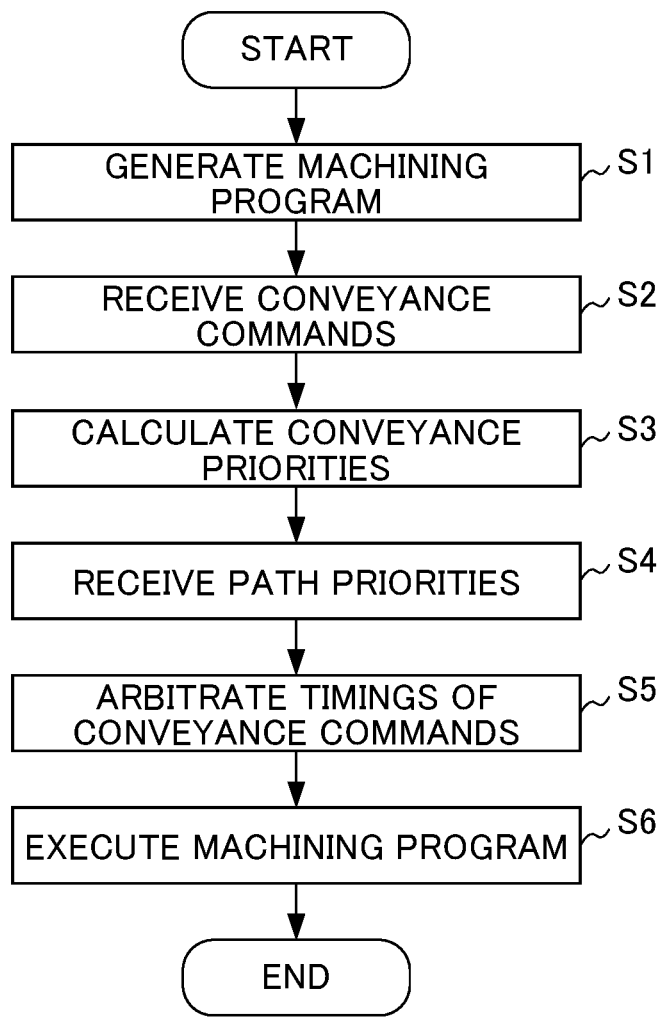
FIG. 19 is a flowchart indicating the operation of the numerical controller according to the first embodiment of the present invention.

FIG. 19 is a flowchart indicating the operation of the numerical controller 10.

The operation of the numerical controller 10 is described with reference to FIG. 19.

In step S1, the machining program generation unit 101 of the numerical controller 10 generates a machining program on the basis of the command input by a user.

In step S2, the conveyance command reception unit 102 of the numerical controller 10 receives conveyance commands.

In step S3, the conveyance priority calculation unit 103 of the numerical controller 10 calculates a conveyance priority associated with each conveyance command.

In step S4, the path priority reception unit 104 of the numerical controller 10 receives a path priority.

In step S5, the arbitration unit 105 of the numerical controller 10 arbitrates the timings of the conveyance commands on the basis of the conveyance priorities and the path priorities.

In step S6, the execution unit 106 of the numerical controller 10 executes the machining program.

It is noted that the flowchart shown in FIG. 19 is indicated merely as an example, and the present invention is not limited thereto.
In an example, the order of the respective steps may be changed.

2.7 Effects Produced By First Embodiment

In the case where a machine tool has a plurality of paths and the numerical controller 10 according to the first embodiment performs multi-path control on the plurality of paths collectively, the numerical controller 10 generates and executes for each path the machining program including the process execution commands and the conveyance commands between the processes described in order of execution on a workpiece.

In this case, different machining programs are executed for respective workpieces, thereby enabling different workpieces to be produced, and hence facilitating mixed flow production.

In addition, the execution order of processes for a workpiece is clarified, thereby improving the readability of the machining program.

3. Second Embodiment

A second embodiment of the present invention is described with reference to FIG. 20 to FIG. 24.

3.1 Structure of Invention

Figure 20:
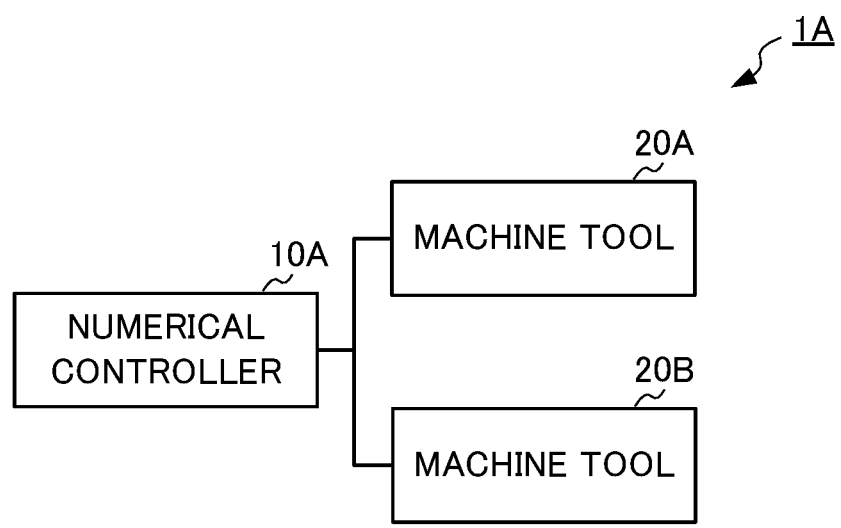
FIG. 20 is a configuration diagram of a numerical control system according to a second embodiment of the present invention.

FIG. 20 shows an overall configuration example of a numerical control system 1A according to the second embodiment of the present invention.

The numerical control system 1A includes a numerical controller 10A, a machine tool 20A and a machine tool 20B.

The numerical controller 10A is capable of communicating with the machine tool 20A and the machine tool 20B.

The numerical controller 10A may be directly and communicably connected to the machine tool 20A and the machine tool 20B, or may be connected to the machine tool 20A and the machine tool 20B via a network not shown in FIG. 20.

Although FIG. 20 shows an aspect of the numerical controller 10A for numerically controlling two machine tools, this is indicated merely as an example. The present invention is not limited thereto.

That is, the numerical controller 10A is capable of numerically controlling an arbitrary number of machine tools. The numerical controller 10A is the same type of numerical controller as the numerical controller 10 according to the first embodiment, and the description of the basic functions thereof is thus omitted.

Similarly, each of the machine tool 20A and the machine tool 20B is the same type of machine tool as the machine tool 20 according to the first embodiment, and the description of the basic functions thereof is thus omitted.

Figure 21:
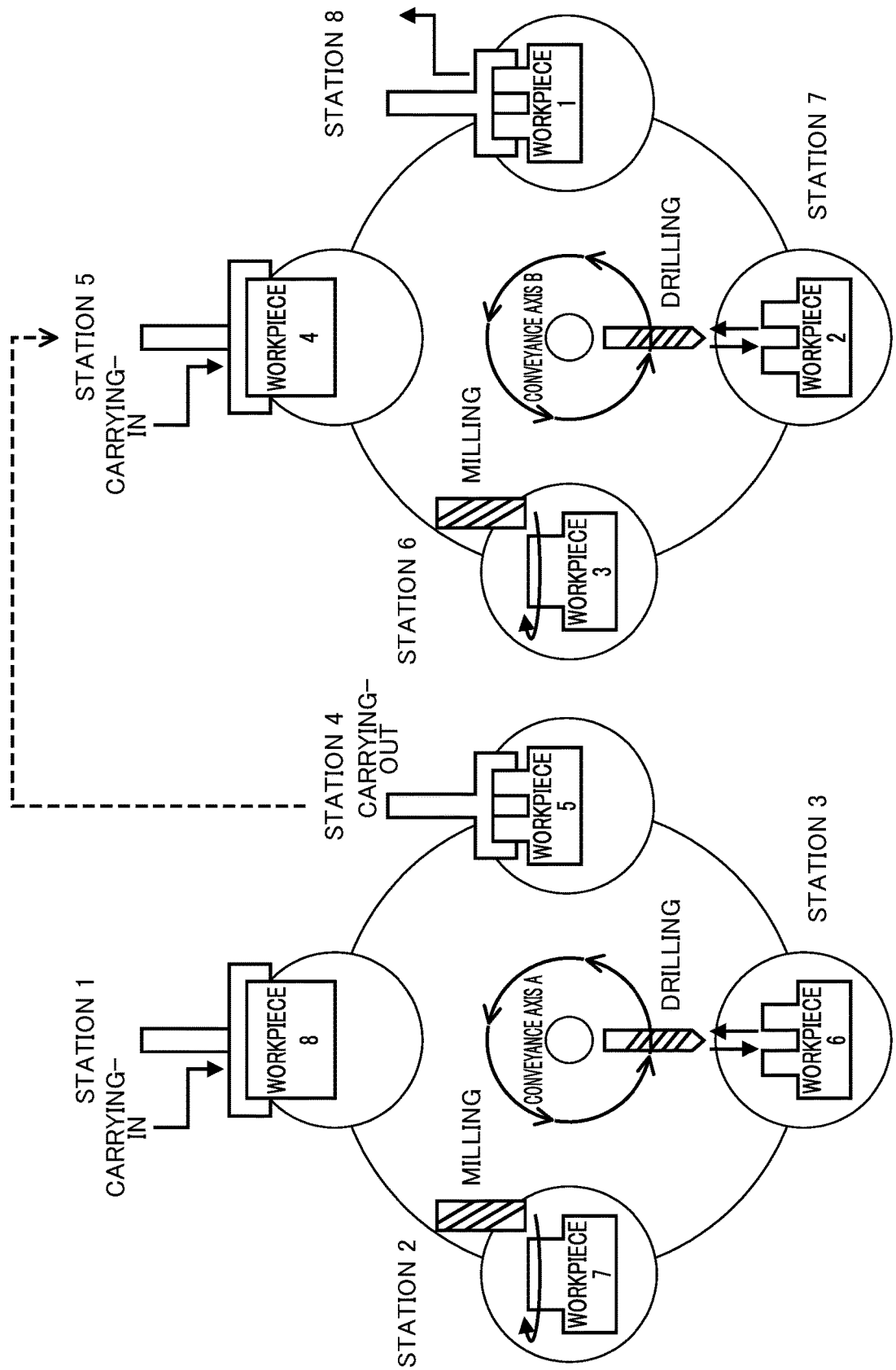
FIG. 21 is a diagram illustrating conveyance timings according to the second embodiment of the present invention.

FIG. 21 shows an example of the machine tool 20A and the machine tool 20B.

The machine tool 20A is a rotary index machine including a station 1 to a station 4.

The station 1 executes the carrying-in process, the station 2 executes the milling process, the station 3 executes the drilling process, and the station 4 executes the carrying-out process.

As the conveyance axis A rotates, an arbitrary workpiece is conveyed to the station 1, the station 2, the station 3 and the station 4 in this order.

Similarly, the machine tool 20B is a rotary index machine including a station 5 to a station 8.

The station 5 executes the carrying-in process, the station 6 executes the milling process, the station 7 executes the drilling process, and the station 8 executes the carrying-out process.

As a conveyance axis B rotates, an arbitrary workpiece is conveyed to the station 5, the station 6, the station 7 and the station 8 in this order.

The workpiece carried out from the station 4 of the machine tool 20A is carried into the station 5 of the machine tool 20B by a loader or a robot, not by the conveyance axis A or the conveyance axis B.

In this case, in order to convey the workpiece from the station 4 to the station 5, a loader or a robot first picks up the workpiece from the station 4.

Then, similarly to the first embodiment, the numerical controller 10A rotates the conveyance axis A and the conveyance axis B.

Lastly, the loader or the robot sets the workpiece picked up from the station 4, on the station 5.

The numerical controller 10A according to the second embodiment has the configuration to be described below, thereby realizing workpiece conveyance across the both of the machine tool 20A and the machine tool 20B.

Figure 22:
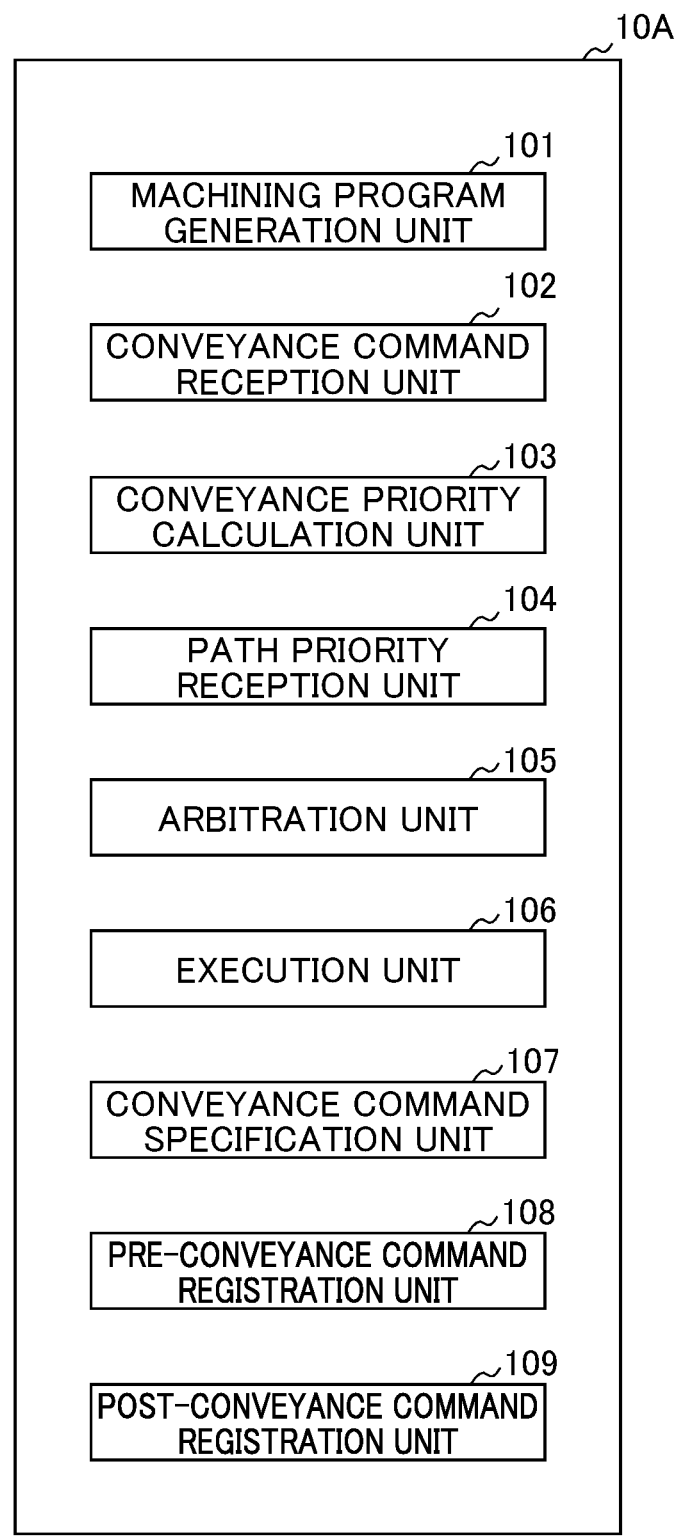
FIG. 22 is a functional block diagram of a numerical controller according to the second embodiment of the present invention.

FIG. 22 is a functional block diagram of the numerical controller 10A.

The numerical controller 10A includes a conveyance command specification unit 107, a pre-conveyance command registration unit 108, and a post-conveyance command registration unit 109, in addition to the machining program generation unit 101, the conveyance command reception unit 102, the conveyance priority calculation unit 103, the path priority reception unit 104, the arbitration unit 105 and the execution unit 106 included in the numerical controller 10 according to the first embodiment.

The conveyance command specification unit 107 specifies one of the conveyance commands from among the conveyance commands described in the machining program.

The pre-conveyance command registration unit 108 registers a pre-conveyance command before the conveyance command specified by the conveyance command specification unit 107, in the machining program.

The post-conveyance command registration unit 109 registers a post-conveyance command after the conveyance command specified by the conveyance command specification unit 107, in the machining program.

The respective functions of the numerical controller 10A are as described above.

The next descriptions are about specific examples of the functions of the conveyance command specification unit 107, the pre-conveyance command registration unit 108, and the post-conveyance command registration unit 109.

Figure 23:
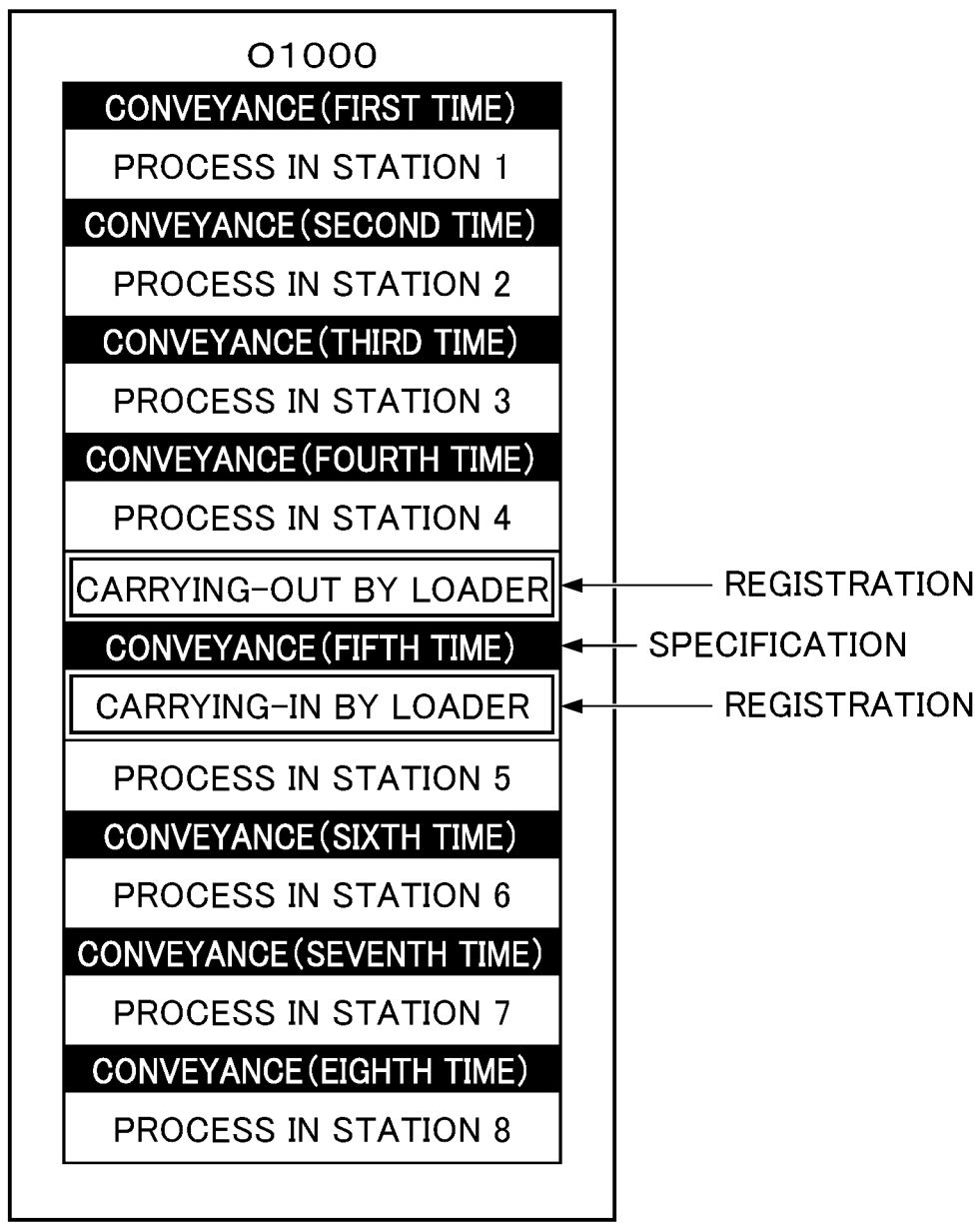
FIG. 23 is a diagram illustrating a method of registering a pre-conveyance command and a post-conveyance command in a machining program according to the second embodiment of the present invention.

FIG. 23 shows an example of a machining program in a certain path for machining a workpiece by using the machine tool 20A and the machine tool 20B shown in FIG. 21.

As shown in FIG. 23, an arbitrary workpiece is subjected to the processes of the station 1 to the station 8, and is conveyed between the processes.

As described above, an arbitrary workpiece is conveyed to the station 5 by a loader or a robot after being subjected to the carrying-out process in the station 4, and is then subjected to the carrying-in process in the station 5.

In relation to this, the conveyance command specification unit 107 specifies the fifth conveyance command from among the conveyance commands described in the machining program.

The pre-conveyance command registration unit 108 then registers a pre-conveyance command "carrying-out by loader" before the fifth conveyance command specified by the conveyance command specification unit 107, in the machining program.

The post-conveyance command registration unit 109 lastly registers a post-conveyance command "carrying-in by loader" after the fifth conveyance command specified by the conveyance command specification unit 107, in the machining program.

The numerical controller 10A having the above-described configuration is capable of realizing workpiece conveyance across the both of the machine tool 20A and the machine tool 20B.

The configuration of the numerical control system 1A according to the second embodiment of the present invention is as described above.

The next description is about the operation of the numerical controller 10A.

3.2 Operation of Numerical Controller 10A

Figure 24:
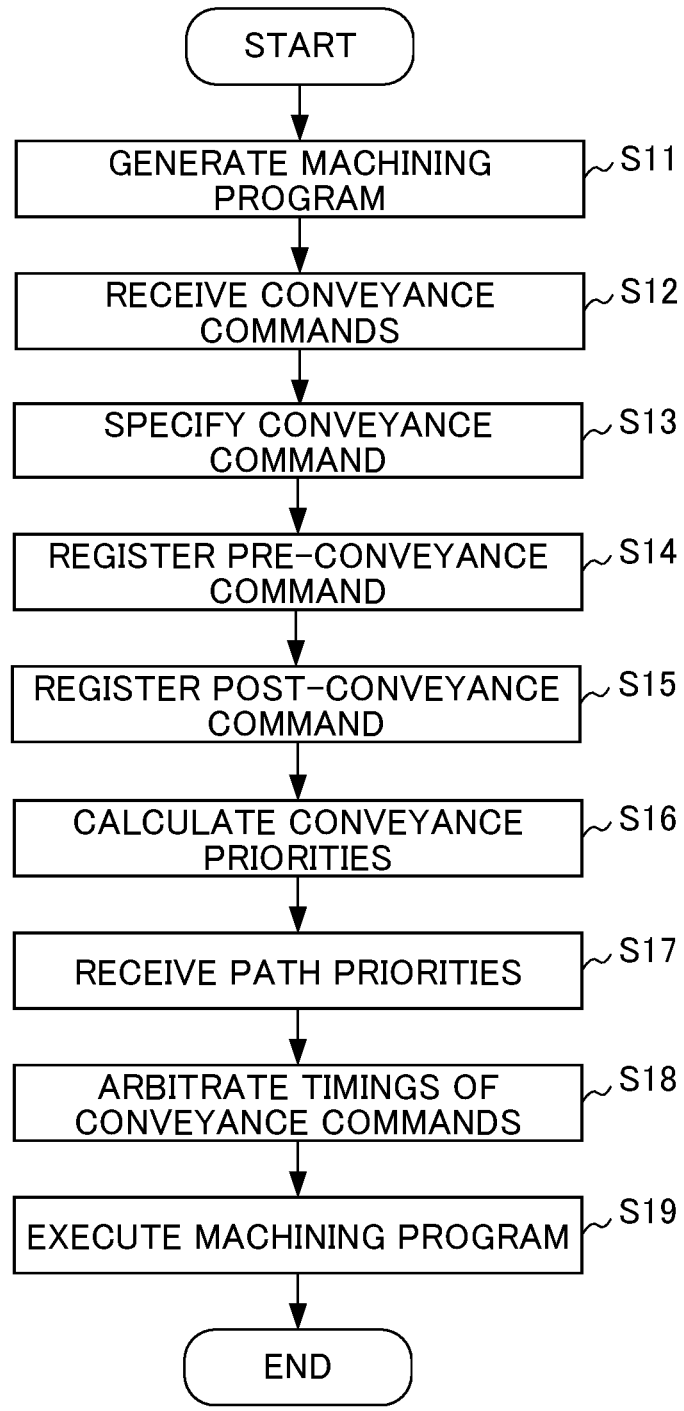
FIG. 24 is a flowchart indicating the operation of the numerical controller according to the second embodiment of the present invention.
Figure 25:
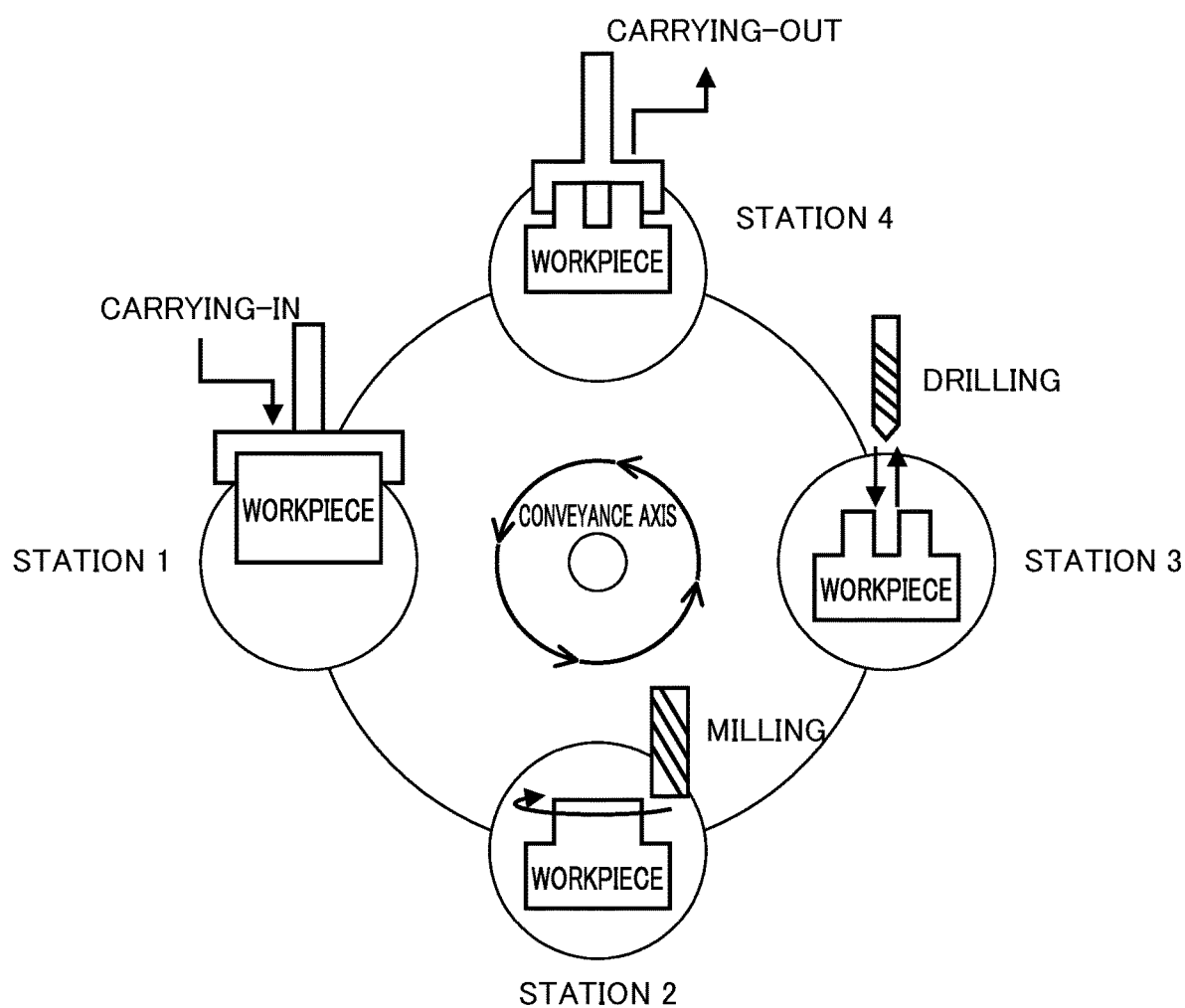
FIG. 25 is a diagram illustrating an example of a conventional rotary index machine.
Figure 26:
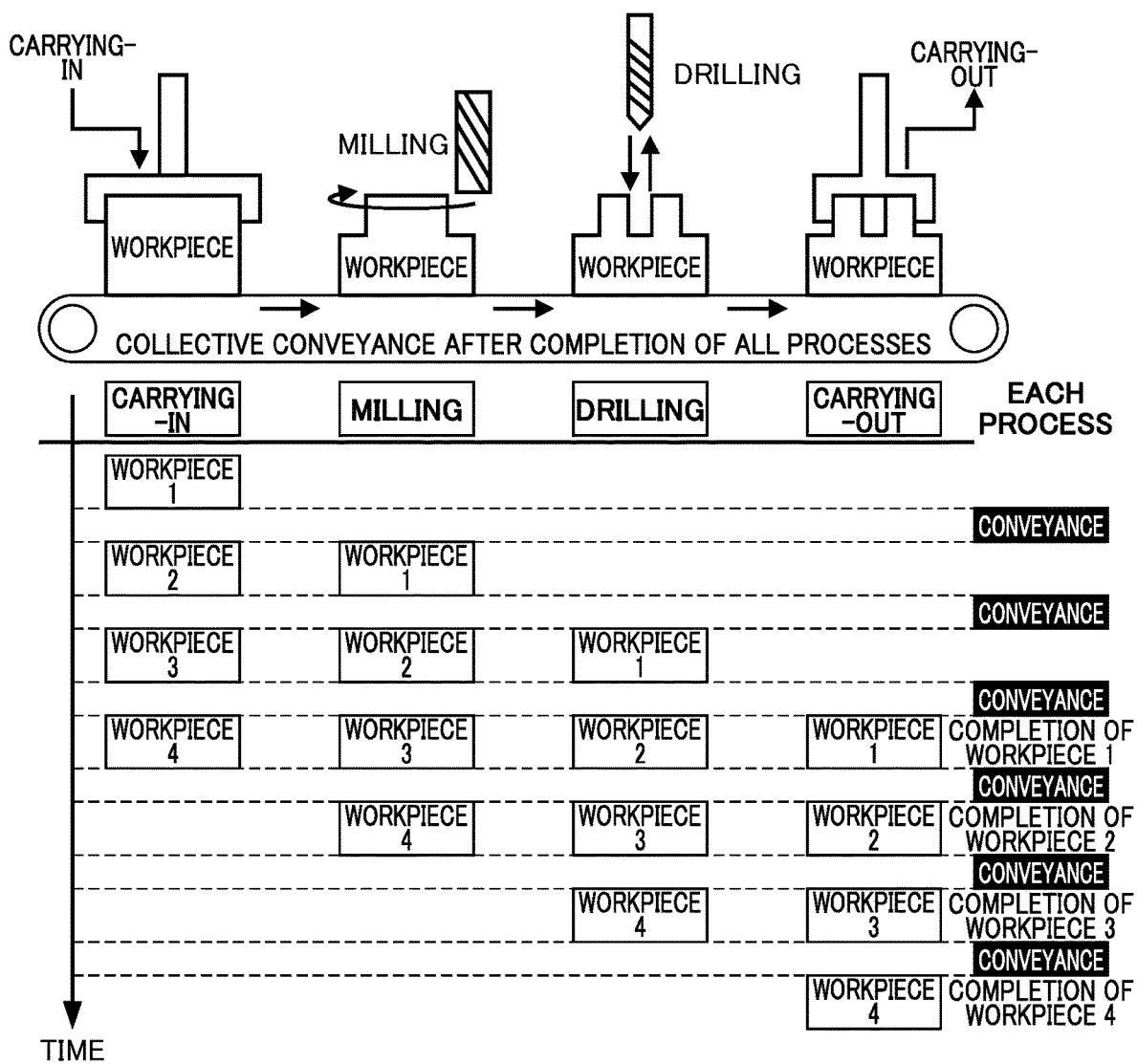
FIG. 26 is another diagram illustrating the example of the conventional rotary index machine.

FIG. 24 is a flowchart indicating the operation of the numerical controller 10A.

The operation of the numerical controller 10A is described below with reference to FIG. 24.

In step S11, the machining program generation unit 101 of the numerical controller 10A generates a machining program on the basis of the command input by a user.

In step S12, the conveyance command reception unit 102 of the numerical controller 10A receives conveyance commands.

In step S13, the conveyance command specification unit 107 of the numerical controller 10A specifies an arbitrary conveyance command from among the conveyance commands described in the machining program.

In step S14, the pre-conveyance command registration unit 108 of the numerical controller 10A registers a pre-conveyance command before the conveyance command specified by the conveyance command specification unit 107, in the machining program.

In step S15, the post-conveyance command registration unit 109 of the numerical controller 10A registers a post-conveyance command after the conveyance command specified by the conveyance command specification unit 107, in the machining program.

In step S16, the conveyance priority calculation unit 103 of the numerical controller 10A calculates a conveyance priority associated with each conveyance command.

In step S17, the path priority reception unit 104 of the numerical controller 10A receives a path priority.

In step S18, the arbitration unit 105 of the numerical controller 10A arbitrates the timings of the conveyance commands on the basis of the conveyance priorities and the path priorities.

In step S19, the execution unit 106 of the numerical controller 10A executes the machining program.

It is noted that the flowchart shown in FIG. 21 is indicated merely as an example, and the present invention is not limited thereto.

In an example, the order of respective steps may be changed.

3.3 Effects Produced By Second Embodiment

In the numerical controller 10A according to the second embodiment, a pre-conveyance command and a post-conveyance command are respectively registered before and after an arbitrary conveyance command included in the machining program. This enables the automatic execution of the operations to be respectively executed before and after a conveyance command in each station, thereby reducing time and effort in describing a program even in the case where the conveyance operation to be performed by a robot or loader between stations is included, and hence improving convenience.

4. Modifications

[4.1 Modification 1]

In the first embodiment and the second embodiment, the arbitration unit 105 of the numerical controller 10 or the numerical controller 10A and another numerical controller may communicate with each other to collectively arbitrate the timings of the conveyance commands in the machine tool subjected to the numerical control executed by the own numerical controller, and the timings of the conveyance commands in the machine tool subjected to the numerical control executed by the another numerical controller.

[4.2 Modification 2]

In the second embodiment, the numerical controller 10A numerically controls a plurality of machine tools, such as the machine tool 20A and the machine tool 20B, more specifically, the machine tool 20A having the conveyance axis A and the machine tool 20B having the conveyance axis B. The present invention is not limited thereto.

In an example, the numerical controller 10A may control one machine tool having a plurality of conveyance axes.

Although the embodiments of the present invention have been described so far, the present invention is not limited to the above-described embodiments.

The effects described in the present embodiments are listed merely as the most preferable effects produced by the present invention. The effects of the present invention are not limited to those described in the present embodiments.

The control method to be performed by the numerical controllers 10, 10A is realized by software.

In the case where the control method is realized by software, programs included in the software are installed in a computer (numerical controllers 10, 10A).

These programs may be recorded in a removable medium and distributed to a user, or may be distributed by being downloaded via a network to a user's computer.

Alternatively, these programs may be provided to a user's computer (numerical controllers 10, 10A) as a web service via a network without being downloaded.

EXPLANATION OF REFERENCE NUMERALS 1, 1A Numerical Control System
10, 10A Numerical Controller
20, 20A, 20B Machine Tool
101 Machining Program Generation Unit
102 Conveyance Command Reception Unit
103 Conveyance Priority Calculation Unit
104 Path Priority Reception Unit
105 Arbitration Unit
106 Execution Unit
107 Conveyance Command Specification Unit
108 Pre-Conveyance Command Registration Unit
109 Post-Conveyance Command Registration Unit

What is claimed is:

1. A numerical controller for a machine tool, the numerical controller being configured to execute multi-path control for collectively controlling a plurality of paths requiring conveyance operations between the processes when each of workpieces receives a plurality of processes, the numerical controller comprising:
a memory configured to store a program; and
a processor configured to execute the program and control the numerical controller to:
execute a plurality of machining programs generated for each of the workpieces so as to correspond to each of the paths, the plurality of machining programs including execution commands of the processes and conveyance commands between the processes,
arbitrate timings of the conveyance commands between the processes described in the machining programs, among the paths,
receive each of the conveyance commands together with a conveyance priority serving as a priority of each of the conveyance commands, and
calculate each of the conveyance priorities on a basis of an order of the conveyance commands in each of the machining programs corresponding to each of the paths, wherein
the timings of the conveyance commands are arbitrated on a basis of the conveyance priorities calculated.

2. A numerical controller for a machine tool, the numerical controller being configured to execute multi-path control for collectively controlling a plurality of paths requiring conveyance operations between the processes when each of workpieces receives a plurality of processes, the numerical controller comprising:
a memory configured to store a program; and
a processor configured to execute the program and control the numerical controller to:
execute a plurality of machining programs generated for each of the workpieces so as to correspond to each of the paths, the plurality of machining programs including execution commands of the processes and conveyance commands between the processes,
arbitrate timings of the conveyance commands between the processes described in the machining programs, among the paths, wherein
the numerical controller and another numerical controller communicate with each other to collectively arbitrate the timing of one or more conveyance commands included in the multi-path control to be executed by the own numerical controller and the timing of one or more conveyance commands included in the multi-path control to be executed by the another numerical controller.

3. A numerical controller for a machine tool, the numerical controller being configured to execute multi-path control for collectively controlling a plurality of paths requiring conveyance operations between the processes when each of workpieces receives a plurality of processes, the numerical controller comprising:
a memory configured to store a program; and
a processor configured to execute the program and control the numerical controller to:
execute a plurality of machining programs generated for each of the workpieces so as to correspond to each of the paths, the plurality of machining programs including execution commands of the processes and conveyance commands between the processes comprising:
specify an arbitrary n-th conveyance command from among the conveyance commands described in each of the machining programs;
register a pre-conveyance command to be executed before the n-th conveyance command, in each of the machining programs; and
register a post-conveyance command to be executed after the n-th conveyance command, in each of the machining programs.

4. The numerical controller according to claim 1, wherein the processor is further configured to execute the program and control the numerical controller to generate each of the machining programs for each of the workpieces, the machining programs each including the execution commands of the processes and the conveyance commands between the processes, the machining programs each corresponding to each of the paths.

5. The numerical controller according to claim 1, wherein the processor is further configured to execute the program and control the numerical controller to:
determine the processes described in each of the machining programs; and
register each of the conveyance commands between the processes determined.

6. The numerical controller according to claim 1, wherein the processor is further configured to execute the program and control the numerical controller to:
receive a path priority serving as a priority for each of the paths, wherein
the timings of the conveyance commands are arbitrated on a basis of the conveyance priorities and the path priorities.

* * * * *